US010501598B2

(12) United States Patent
Baldwin et al.

(10) Patent No.: US 10,501,598 B2
(45) Date of Patent: Dec. 10, 2019

(54) METHOD OF MAKING COEXTRUDED, CROSSLINKED MULTILAYER POLYOLEFIN FOAM STRUCTURES FROM RECYCLED CROSSLINKED POLYOLEFIN FOAM MATERIAL

(71) Applicant: TORAY PLASTICS (AMERICA), INC., N. Kingstown, RI (US)

(72) Inventors: Jesse Jude Baldwin, Strasburg, VA (US); Dan Ben-Daat, Winchester, VA (US); Winston Kenneth Bishop, III, Stephens City, VA (US); Kaitlyn Michelle Bock, Winchester, VA (US); Pawel Sieradzki, Winchester, VA (US)

(73) Assignee: TORAY PLASTICS (AMERICA), INC., N. Kingstown, RI (US)

( * ) Notice: Subject to any disclaimer, the term of this patent is extended or adjusted under 35 U.S.C. 154(b) by 275 days.

(21) Appl. No.: 15/637,723

(22) Filed: Jun. 29, 2017

(65) Prior Publication Data

US 2019/0002662 A1    Jan. 3, 2019

(51) Int. Cl.
*C08J 9/35* (2006.01)
*C08F 10/02* (2006.01)
(Continued)

(52) U.S. Cl.
CPC .............. *C08J 9/35* (2013.01); *B29C 35/0805* (2013.01); *B29C 35/0866* (2013.01); *B29C 44/24* (2013.01); *B29C 48/0012* (2019.02); *B29C 48/0022* (2019.02); *B29C 48/21* (2019.02); *C08F 10/02* (2013.01); *C08F 10/06* (2013.01); *B29C 44/3488* (2013.01); *B29C 44/505* (2016.11); *B29C 44/5627* (2013.01); *B29C 2035/046* (2013.01); *B29C 2035/0855* (2013.01); *B29C 2035/0872* (2013.01);
(Continued)

(58) Field of Classification Search
CPC .................................. C08J 9/35; B29C 44/24
See application file for complete search history.

(56) References Cited

U.S. PATENT DOCUMENTS 4,203,815 A   5/1980  Noda et al.
4,410,602 A   10/1983 Komoda et al.
(Continued)

FOREIGN PATENT DOCUMENTS

CN    1584248    2/2005
CN    1854126    12/2010
(Continued)

OTHER PUBLICATIONS

Notification of the First Office Action dated Nov. 21, 2018, directed to CN Application No. 201580071862.6; 49 pages.
(Continued)

*Primary Examiner* — Alex A Rolland
(74) *Attorney, Agent, or Firm* — Morrison & Foerster LLP

(57) ABSTRACT

The present disclosure is directed to a physically crosslinked, closed cell continuous multilayer foam structure comprising at least one foam polypropylene/polyethylene layer with a recycled polyolefin material layer. The multilayer foam structure can be obtained by coextruding a multilayer structure comprising at least one nonrecycled foam composition layer with at least one recycled foam composition layer, irradiating the coextruded structure with ionizing radiation, and continuously foaming the irradiated structure.

28 Claims, 11 Drawing Sheets

(51) Int. Cl.

| | | |
|---|---|---|
| *C08F 10/06* | (2006.01) | |
| *B29C 35/08* | (2006.01) | |
| *B29C 44/24* | (2006.01) | |
| *B29C 48/00* | (2019.01) | |
| *B29C 48/21* | (2019.01) | |
| *C08J 9/33* | (2006.01) | |
| *C08J 3/24* | (2006.01) | |
| *B29K 23/00* | (2006.01) | |
| *B29C 44/34* | (2006.01) | |
| *B29C 44/56* | (2006.01) | |
| *B29K 105/26* | (2006.01) | |
| *B29C 35/04* | (2006.01) | |
| *B29K 105/24* | (2006.01) | |
| *B29C 44/50* | (2006.01) | |

(52) U.S. Cl.
CPC ...... *B29K 2023/06* (2013.01); *B29K 2023/12* (2013.01); *B29K 2105/24* (2013.01); *B29K 2105/26* (2013.01); *C08J 3/24* (2013.01); *C08J 9/33* (2013.01)

(56) References Cited

U.S. PATENT DOCUMENTS

| | | |
|---|---|---|
| 5,118,561 A | 6/1992 | Gusavage et al. |
| 5,462,794 A | 10/1995 | Lindemann et al. |
| 5,552,448 A | 9/1996 | Kobayashi et al. |
| 5,594,038 A | 1/1997 | Kobayashi et al. |
| 5,605,660 A | 2/1997 | Buongiorno et al. |
| 5,605,961 A | 2/1997 | Lee et al. |
| 5,646,194 A | 7/1997 | Kobayashi et al. |
| 5,668,217 A | 9/1997 | Clark |
| 5,721,315 A | 2/1998 | Evans et al. |
| 5,738,922 A | 4/1998 | Kobayashi et al. |
| 5,783,630 A | 7/1998 | Evans et al. |
| 5,928,776 A | 7/1999 | Shioya et al. |
| 5,942,576 A | 8/1999 | Evans et al. |
| 5,959,032 A | 9/1999 | Evans et al. |
| 5,965,667 A | 10/1999 | Evans et al. |
| 5,985,999 A | 11/1999 | Dominguez et al. |
| 6,031,048 A | 2/2000 | Evans et al. |
| 6,093,496 A | 7/2000 | Dominguez et al. |
| 6,093,773 A | 7/2000 | Evans et al. |
| 6,127,480 A | 10/2000 | Dominguez et al. |
| 6,140,416 A | 10/2000 | Evans et al. |
| 6,146,574 A | 11/2000 | Henkee et al. |
| 6,214,914 B1 | 4/2001 | Evans et al. |
| 6,218,023 B1 | 4/2001 | DeNicola, Jr. et al. |
| 6,251,319 B1 | 6/2001 | Tusim et al. |
| 6,306,964 B1 | 10/2001 | Evans et al. |
| 6,420,482 B1 | 7/2002 | Dominguez et al. |
| 6,465,606 B2 | 10/2002 | Evans et al. |
| 6,537,404 B1 | 3/2003 | Ishiwatari et al. |
| 6,586,482 B2 | 7/2003 | Gehlsen et al. |
| 6,586,489 B2 | 7/2003 | Gehlsen et al. |
| 6,593,380 B2 | 7/2003 | Gehlsen et al. |
| 6,638,985 B2 | 10/2003 | Gehlsen et al. |
| 6,875,484 B1 | 4/2005 | Kogure et al. |
| 6,949,283 B2 | 9/2005 | Kollaja et al. |
| 7,083,849 B1 | 8/2006 | Albrecht et al. |
| 7,582,352 B2 | 9/2009 | Kobayashi et al. |
| 7,655,296 B2 | 2/2010 | Haas et al. |
| 7,820,282 B2 | 10/2010 | Haas et al. |
| 7,879,441 B2 | 2/2011 | Gehlsen et al. |
| 8,404,780 B2 | 3/2013 | Weaver et al. |
| 9,663,958 B2 | 5/2017 | Baldwin et al. |
| 9,669,600 B2 | 6/2017 | Baldwin et al. |
| 2002/0119281 A1 | 8/2002 | Higgins et al. |
| 2003/0219582 A1 | 11/2003 | Ramesh et al. |
| 2003/0232210 A1 | 12/2003 | Haas et al. |
| 2004/0229968 A1 | 11/2004 | Dontula et al. |
| 2006/0276581 A1 | 12/2006 | Ratzsch et al. |
| 2007/0287003 A1 | 12/2007 | Matsumura et al. |
| 2010/0215879 A1 | 8/2010 | Dooley et al. |
| 2010/0266799 A1 | 10/2010 | Koonce et al. |
| 2010/0286357 A1 | 11/2010 | Matsumura et al. |
| 2011/0014835 A1 | 1/2011 | Sieradzki et al. |
| 2011/0244206 A1 | 10/2011 | Penache et al. |
| 2012/0295086 A1 | 11/2012 | Baldwin et al. |
| 2014/0061967 A1 | 3/2014 | Stanhope et al. |
| 2014/0070442 A1 | 3/2014 | Morita et al. |
| 2014/0170344 A1 | 6/2014 | Pramanik et al. |
| 2014/0272380 A1 | 9/2014 | Chapman |
| 2015/0174871 A1 | 6/2015 | Sollmann et al. |
| 2015/0183142 A1 | 7/2015 | Baldwin et al. |
| 2015/0184400 A1 | 7/2015 | Baldwin et al. |
| 2016/0185025 A1 | 6/2016 | Baldwin et al. |
| 2016/0185079 A1 | 6/2016 | Baldwin et al. |
| 2016/0185080 A1 | 6/2016 | Baldwin et al. |
| 2017/0225431 A1 | 8/2017 | Baldwin et al. |
| 2017/0246839 A1 | 8/2017 | Baldwin et al. |
| 2018/0126617 A1 | 5/2018 | Baldwin et al. |
| 2018/0134005 A1 | 5/2018 | Baldwin et al. |
| 2018/0281260 A1 | 10/2018 | Ben-Daat et al. |
| 2018/0281358 A1 | 10/2018 | Ben-Daat et al. |

FOREIGN PATENT DOCUMENTS

| | | |
|---|---|---|
| CN | 101735763 | 7/2013 |
| CN | 102858859 | 3/2014 |
| CN | 103849004 | 6/2014 |
| EP | 0679487 A1 | 11/1995 |
| EP | 0 719 626 | 7/1996 |
| EP | 1 066 958 | 1/2001 |
| EP | 0745641 B1 | 3/2004 |
| EP | 1 449 869 | 8/2004 |
| EP | 1664169 | 5/2009 |
| JP | 59-215329 | 12/1984 |
| JP | 7-258445 | 10/1995 |
| JP | 9-132661 | 5/1997 |
| JP | 11-302425 | 11/1999 |
| JP | 2000-37766 | 2/2000 |
| JP | 2007-277417 | 10/2007 |
| WO | WO 96/27485 | 9/1996 |
| WO | 2009/057131 | 5/2009 |
| WO | WO 2011/008845 | 1/2011 |
| WO | WO 2013/057737 | 4/2013 |
| WO | WO 2014/049792 | 4/2014 |
| WO | 2016/109544 A1 | 7/2016 |

OTHER PUBLICATIONS

Baldwin et al., U.S. Office Action dated Oct. 6, 2017, directed to U.S. Appl. No. 14/586,781; 8 pages.

Baldwin et al., U.S. Office Action dated Dec. 27, 2017, directed to U.S. Appl. No. 15/581,503; 6 pages.

Chinese Office Action dated Apr. 18, 2018, directed to CN Application No. 201480074773.2; 7 pages.

Extended European Search Report dated Aug. 23, 2017, directed to European Application No. 14876099.4; 9 pages.

Chinese Office Action dated Aug. 1, 2017, directed to CN Application No. 201480074773.2; 21 pages.

"Modification of Polyolefins with Elastamine Polyetheramines," (Oct. 2009) technical brochure published by Huntsman Corporation; 3 pages "The JEFFAMINE Polyetheramines," (May 2007) technical brochure published by Huntsman Corporation; 6 pages.

Ben-Daat et al, Office Action dated Feb. 14, 2019, directed to U.S. Appl. No. 15/476,660; 9 pages.

Ben-Daat et al, Office Action dated Jan. 10, 2019, directed to U.S. Appl. No. 15/476,681; 14 pages.

Extended European Search Report dated Sep. 4, 2018, directed to European Application No. 18164260.4; 8 pages.

Extended European Search Report dated Sep. 4, 2018, directed to European Application No. 18164262.0; 8 pages.

Kobayashi, S. et al. (2011) "Amino-Functionalized Polyethylene for Enhancing the Adhesion between Polyolefins and Polyurethanes," Industrial & Engineering chemistry Research 50(6): 3274-3279.

(56) References Cited

OTHER PUBLICATIONS

Lu et al. (2003) "Promoting Adhesion to Thermoplastic Polyurethane (TPU) by Amine Functional Polypropylenes," Polymeric Materials: Science & Engineering 89: 844-847.

Lu et al. (2005) "Melt Amination of Polypropylenes," Journal of Polymer Science: Part A 43: 4217-4232.

Lu, Q. et al. (2003) "Compatibilized Blends of Thermoplastic Polyurethane (TPU) and Polypropylene," Macromolecular Sympomsia 198: 221-232.

Lu, Q. et al. (2004) "Comparing the Compatibility of Various Functionalized Polypropylenes with Thermoplastic Polyurethane (TPU)," Polymer 45: 1981-1991.

Song, J. et al. (2011) "Flow Accelerates Adhesion Between Functional Polyethylene and Polyurethane," AIChE Journa 57(12): 3496-3506.

Wang et al (2006). "Polyurethane/Polyolefin Blends: Morphology, Compatibilization and Mechanical Properties," Polymers and Polymer Composites 14 (1): 1-11.

European Search Report dated Sep. 14, 2018, directed to European Patent Application No. 15876173.4; 18 pages.

Extended European Search Report dated Sep. 13, 2018, directed to European Application No. 18180821.3; 7 pages.

Japanese Office Action dated Aug. 13, 2018, directed to Japanese Application No. 2016-544141; 7 pages.

Baldwin et al., U.S. Office Action dated May 2, 2016, directed to U.S. Appl. No. 14/144,345; 18 pages.

Baldwin et al., U.S. Office Action dated Jan. 25, 2017, directed to U.S. Appl. No. 14/144,345; 15 pages.

Baldwin et al., U.S. Appl. No. 14/144,986, filed Dec. 31, 2013; 37 pages.

Baldwin et al., U.S. Office Action dated Aug. 25, 2016, directed to U.S. Appl. No. 14/144,986; 6 pages.

Baldwin et al., U.S. Office Action dated Oct. 6, 2016, directed to U.S. Appl. No. 14/586,721; 7 pages.

Baldwin et al., U.S. Office Action dated Jun. 6, 2017, directed to U.S. Appl. No. 14/586,721; 5 pages.

Baldwin et al., U.S. Office Action dated Oct. 3, 2016, directed to U.S. Appl. No. 14/586,745; 8 pages.

International Search Report and Written Opinion dated Mar. 25, 2015, directed to International Application No. PCT/US2014/72548; 10 pages.

International Search Report and Written Opinion dated May 20, 2016, directed to International Application No. PCT/US2015/67875; 14 pages.

Baldwin et al., U.S. Office Action dated May 17, 2018, directed to U.S. Appl. No. 14/586,781; 9 pages.

Baldwin et al., U.S. Office Action dated Apr. 5, 2018, directed to U.S. Appl. No. 15/818,691; 6 pages.

METHOD OF MAKING COEXTRUDED, CROSSLINKED MULTILAYER POLYOLEFIN FOAM STRUCTURES FROM RECYCLED CROSSLINKED POLYOLEFIN FOAM MATERIAL

FIELD OF THE DISCLOSURE

This disclosure relates to multilayer polyolefin foam structures. More particularly, this disclosure relates to coextruded, crosslinked polyolefin multilayer foam structures that include recycled polyolefin foam material.

BACKGROUND

Over the past three decades, manufacturing businesses have been successful in recycling many types of wastes: newspapers, cardboard, aluminum, steel, glass, various plastics, films, foams, etc. In the case of plastics, there are certain types of plastic waste that do not readily recycle into commercially viable new products. One such type of waste is crosslinked polyolefin foam.

Currently, there are various methods and systems for reclaiming and recycling foams, including crosslinked olefin foams. However, various problems arise whenever recycled material is used in the manufacturing process.

SUMMARY

Applicants have discovered that using recycled crosslinked polyolefin foam material to create new foam structures can cause unwanted surface variations on the foam. These unwanted surface variations can include unwanted surface roughness, unwanted surface softness, unwanted surface firmness, unwanted surface energy, and unwanted surface adhesive incompatibility among others. In certain commercial applications, such as in the automotive interior trim industry, the surface properties of the foam are critical. When used for automotive interior trim, laminators will normally laminate a film, fabric, fiber layer, or leather to the foam. The foam laminate then typically can be thermoformed onto a hard polypropylene, ABS, or wood fiber composite substrate. In order for the foam laminate formation and/or the foam laminate thermoformed formation to be successful, the foam surfaces should be consistent. Variations on the foam surfaces can negatively affect lamination strength and quality.

An example of undesirable surface characteristics is illustrated in FIGS. 1A and 1B. The foams in FIGS. 1A and 1B contain 8% parts per hundred parts resin ("PPHR") shredded factory scrap crosslinked polypropylene/polyethylene blended foam. As shown in FIGS. 1A and 1B, dark spots and "gels" can be seen as black colored recycled foam that has not been fully broken down, dispersed, and otherwise reincorporated into these foam sheets. These spots and "gels" can cause problems for a laminator attaching a film, fabric, fiber layer, or leather to these foams. Specifically, adhesion at the "gel" may be poorer and may delaminate during a secondary operation such as thermoforming, causing a visible blister-like defect on the film, fabric, fiber layer, or leather.

Applicants have discovered methods for producing coextruded multilayer foam structures including a surface foam layer(s) derived from virgin (non-recycled) polyolefin material and an interior foam layer(s) derived from one or more recycled crosslinked polyolefin foam materials. In addition, these foam structures can include the recycled foam layer(s) sandwiched or buried between two non-recycled foam layers. Accordingly, these multilayer foam structures can allow manufacturers to continue to use recycled crosslinked polyolefin foam material to create lower cost and more environmentally friendly products that can perform to the same standards as foam structures made entirely from non-recycled material.

Described are methods of making these structures. More particularly, described are formulations of physically crosslinked, co-extruded continuous multilayer foam structures with a closed cell morphology. These formulations can utilize recycled crosslinked polyolefin foam material and incorporate it into a layer. As recited herein, a "structure" includes, but is not limited to, layers, films, webs, sheets, or other similar structures.

Some embodiments include methods of forming a multilayer structure that includes shredding a polyolefin foam, agglomerating the shredded foam, granulating the agglomerated foam to form a recycled, crosslinked polyolefin foam material; and coextruding a first layer and a second layer on a side of the first layer. The first layer includes polypropylene, polyethylene, or a combination of polypropylene and polyethylene and a first chemical foaming agent and the second layer includes 2.5-25 wt % the recycled, crosslinked polyolefin foam material, 75-97.5 wt % polypropylene, polyethylene, or a combination of polypropylene and polyethylene, and a second chemical foaming agent. In some embodiments, the granules of the recycled, crosslinked polyolefin foam material have a width of 3-7 mm. In some embodiments, the granules of the recycled, crosslinked polyolefin foam material are mechanically pulverized, wherein particles of the mechanically pulverized recycled, crosslinked polyolefin foam material have a width of 0.2-2 mm. In some embodiments, the method can include coextruding a third layer on a side of the second layer opposite the first layer, wherein the third layer includes polypropylene and/or polyethylene and a third chemical foaming agent. In some embodiments, the first layer and the third layer are substantially free of recycled polyolefin material. In some embodiments, the first layer comprises polypropylene with a melt flow index of 0.1-25 grams per 10 minutes at 230° C. In some embodiments, the first layer comprises polyethylene with a melt flow index of 0.1-25 grams per 10 minutes at 190° C. In some embodiments, the first, second, and third layers comprise a crosslinking agent. In some embodiments, the first, second, and third chemical foaming agent is azodicarbonamide. In some embodiments, the first layer and third layer comprise polypropylene and polyethylene.

In some embodiments, the method can include irradiating the coextruded layers with ionizing radiation and foaming the irradiated, coextruded layers. In some embodiments, the ionizing radiation is selected from the group consisting of alpha, beta (electron), x-ray, gamma, and neutron. In some embodiments, the coextruded structure is irradiated up to 4 separate times. In some embodiments, the ionizing radiation is an electron beam with an acceleration voltage of 200-1500 kV. In some embodiments, an absorbed electron beam dosage is 10-500 kGy. In some embodiments, the ionizing radiation crosslinks the extruded structure to a crosslinking degree of 20-75%. In some embodiments, foaming comprises heating the irradiated structure with molten salt. In some embodiments, the multilayer foam structure has a density of 20-250 kg/m$^3$. In some embodiments, the multilayer foam structure has an average closed cell size of 0.05-1.0 mm. In some embodiments, the multilayer foam structure has a thickness of 0.2-50 mm. In some embodiments, a mean surface roughness for the first layer is less than 80 µm.

Some embodiments include a laminate that includes a multilayer foam structure and a laminate layer. The multilayer foam structure can include a coextruded first foam layer that includes polypropylene and/or polyethylene and a second coextruded foam layer on a side of the first foam layer. The second foam layer can include 2.5-25 wt. % the recycled, crosslinked polyolefin foam material and 75-97.5 wt. % polypropylene, polyethylene, or a combination of polypropylene and polyethylene. The laminate layer can be on a side of the first foam layer opposite the second foam layer. The laminate layer can be a film, fabric, fiber layer, or a leather. The first foam layer can have a mean surface roughness less than 80 µm. The recycled, crosslinked polyolefin foam material can include mechanically agglomerated or mechanically pulverized polyolefin foam material. The multilayer foam structure can also include a coextruded third foam layer on a side of the second foam layer opposite the first foam layer. The third layer can include polypropylene and/or polyethylene. The first and/or third layers can be substantially free of recycled crosslinked polyolefin foam material. In addition, the laminate can further be thermoformed onto a substrate such that the substrate is on a side of the third foam layer opposite the second foam layer.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters. For example, a statement that the layer has less than about 20 wt %, about 15 wt %, or about 10 wt % of a chemical foaming agent, is meant to mean that the weight percentage of the chemical foaming agent in the layer can be less than about 20 wt %, less than about 15 wt %, or less than about 10 wt %.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

It is understood that aspects and embodiments described herein include "consisting" and/or "consisting essentially of" aspects and embodiments. For all methods, systems, compositions, and devices described herein, the methods, systems, compositions, and devices can either comprise the listed components or steps, or can "consist of" or "consist essentially of" the listed components or steps. When a system, composition, or device is described as "consisting essentially of" the listed components, the system, composition, or device contains the components listed, and may contain other components which do not substantially affect the performance of the system, composition, or device, but either do not contain any other components which substantially affect the performance of the system, composition, or device other than those components expressly listed; or do not contain a sufficient concentration or amount of the extra components to substantially affect the performance of the system, composition, or device. When a method is described as "consisting essentially of" the listed steps, the method contains the steps listed, and may contain other steps that do not substantially affect the outcome of the method, but the method does not contain any other steps which substantially affect the outcome of the method other than those steps expressly listed.

In the disclosure, "substantially free of" a specific component, a specific composition, a specific compound, or a specific ingredient in various embodiments, is meant that less than about 2%, less than about 1%, less than about 0.5%, less than about 0.1%, less than about 0.05%, less than about 0.025%, or less than about 0.01% of the specific component, the specific composition, the specific compound, or the specific ingredient is present by weight. Preferably, "substantially free of" a specific component, a specific composition, a specific compound, or a specific ingredient indicates that less than about 1% of the specific component, the specific composition, the specific compound, or the specific ingredient is present by weight.

Additional advantages will be readily apparent to those skilled in the art from the following detailed description. The examples and descriptions herein are to be regarded as illustrative in nature and not restrictive.

BRIEF DESCRIPTION OF THE DRAWINGS

Exemplary embodiments are described with reference to the accompanying figures, in which.

DETAILED DESCRIPTION

Figure 1A:
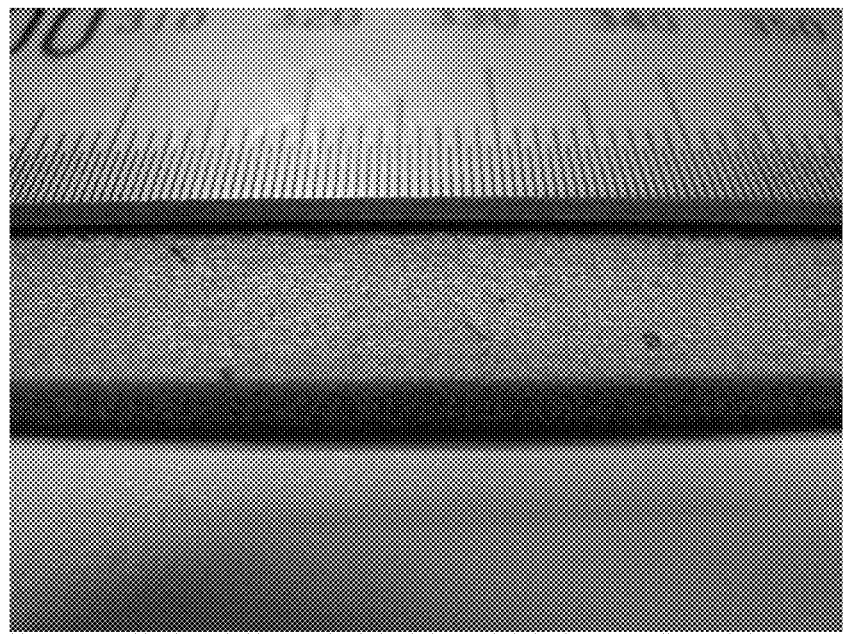
FIG. 1A is a first photo of a foam containing shredded recycled, crosslinked polyolefin foam.
Figure 1B:
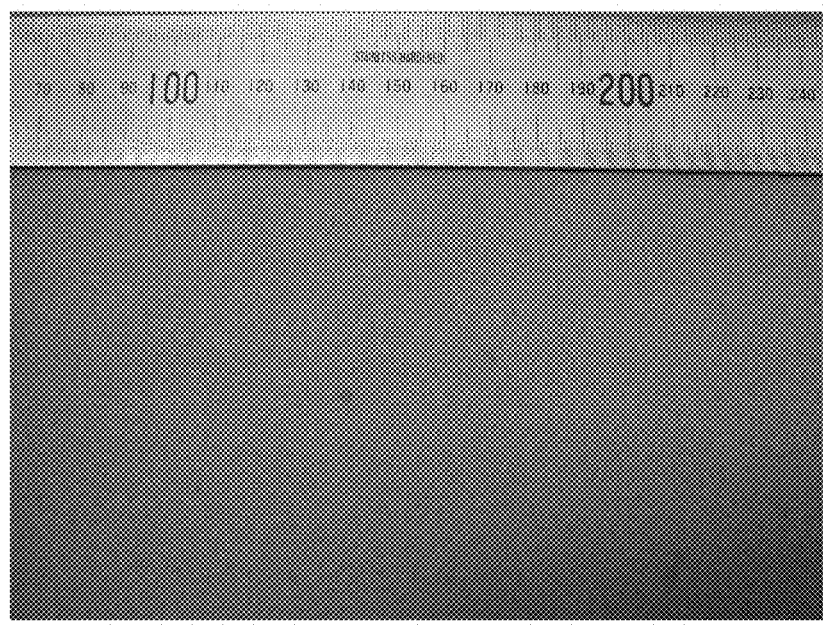
FIG. 1B is a second photo of a foam containing shredded recycled, crosslinked polyolefin foam.

Described herein are methods of producing crosslinked, closed cell coextruded multilayer foam structures. A layer or layers of the multilayered foam structure can be derived from recycled crosslinked polyolefin foam material. The methods for producing a crosslinked, closed cell co-extruded multi-layer foam structure may include the steps of (a) co-extrusion, (b) irradiation, and (c) foaming.

Co-extrusion is the extrusion of multiple layers of material simultaneously. This type of extrusion can utilize two or more extruders to deliver a steady volumetric throughput of material to an extrusion head (die) which can extrude the materials in the desired form. In the co-extrusion step, compositions can be fed into multiple extruders to form an unfoamed, multilayer structure. For example, an "A" recycled foam composition can be fed into one extruder and a "B" nonrecycled foam composition can be fed into a second extruder. The method of feeding ingredients into the extruders can be based on the design of the extruder and the material handling equipment available. Blending ingredients of the compositions may be performed prior to feeding into the extruders, if necessary, to facilitate their dispersal. A Henshel mixer can be used for such blending. All ingredients can be blended and fed thru a single port in an extruder. The ingredients can also be individually fed thru separate designated ports for each ingredient. For example, if the crosslinking promoter or any other additive is a liquid, the promoter and/or additives can be added through a feeding gate (or gates) on the extruder or through a vent opening on the extruder (if equipped with a vent) instead of being blended with solid ingredients. Combinations of blended ingredients and individual ingredient port feeding can also be employed.

Each extruder can deliver a steady amount of each composition into one or more manifolds followed by a sheeting die to create an unfoamed, co-extruded multilayer sheet. There are two common methods for co-extruding materials: (1) feed block manifolds; and (2) multi-manifolds within the die. Elements of a feed block manifold can include: (a) inlet ports for upper, middle, and lower layers; (b) a streamlined melt lamination area that channels separate flow streams into one laminated melt stream inside the feed block; (c) an adapter plate between the feed block and the sheet die; and/or (d) a sheet die (similar to a monolayer die), wherein the laminated melt stream enters the center of the die and spreads out along the manifold flowing out of the die exit as a distinct multilayer extrudate. Elements of a multi-manifold die can be: (a) similar to a monolayer die, except that there is more than one feed channel; (b) that each melt channel has its own choker bar for flow control; and/or (c) that the melt streams converge inside the die near the exit and emerge as a distinct multilayer extrudate.

Layer thicknesses can be determined by the design of the manifold(s) and/or die. For example, an 80/20 feed block manifold can deliver compositions in approximately a 4:1 ratio when the speed and size of each extruder is matched accordingly. This ratio can be altered by changing, for example: (a) the amount of material fed into each extruder; (b) the relative extrusion speed between one extruder and another; (c) the relative size of each extruder; and/or (d) the composition (i.e., the viscosity) of the individual layers.

The thickness of the overall multilayer sheet can be controlled by the overall die gap. However, the overall multilayer sheet thickness can further be adjusted, for example, by stretching (i.e., "drawing") the melted multilayer extrudate and/or flattening the melted multilayer extrudate through a nip.

The multilayer structures disclosed herein can include at least 2 layers made up of different compositions, where at least one of the layers can include crosslinked, recycled polyolefin foam material (i.e., an "A" layer). In some embodiments, the multilayer structures disclosed herein can include at least one layer that is substantially free of crosslinked, recycled polyolefin foam material (i.e., a "B" layer). In some embodiments, the multilayer structure can include at least one "A" layer with crosslinked, recycled polyolefin foam material and at least one "B" layer substantially free of crosslinked, recycled polyolefin foam material. For example, the structure can be an A/B layered structure, B/A/B layered structure, B/A/C layered structure, or can have multiple other layers. In some embodiments, all layers of the multilayer structure can be foamable or foamed. The multilayer structures can include additional layers such as tie layers, film layers, and/or foam layers (including additional recycled and/or non-recycled layers) among others.

The compositions of layers "A" and "B" fed into the extruder can include at least one polypropylene, at least one polyethylene, or a combination thereof. The polypropylene may contain an elastic or softening component, typically an ethylene or rubber component and thus includes, but is not limited to, polypropylene, impact modified polypropylene, polypropylene-ethylene copolymer, impact modified polypropylene-ethylene copolymer, metallocene polypropylene, metallocene polypropylene-ethylene copolymer, metallocene polypropylene olefin block copolymer (with a controlled block sequence), polypropylene based polyolefin plastomer, polypropylene based polyolefin elasto-plastomer, polypropylene based polyolefin elastomer, polypropylene based thermoplastic polyolefin blend, and polypropylene based thermoplastic elastomeric blend. The polyethylene includes, but is not limited to, LDPE, LLDPE (homopolymer, copolymer with butene or hexene or octene, terpolymer with butene and/or hexene and/or octene), VLDPE (homopolymer, copolymer with butene or hexene or octene, terpolymer with butene and/or hexene and/or octene), VLLDPE (homopolymer, copolymer with butene or hexene or octene, terpolymer with butene and/or hexene and/or octene), HDPE, polyethylene-propylene copolymer, metallocene polyethylene, metallocene ethylene-propylene copolymer, and metallocene polyethylene olefin block copolymer (with a controlled block sequence), any of which may contain copolymers that contain acetate and/or ester groups.

In some embodiments, the amount of at least one polypropylene and/or at least one polyethylene in a non-recycled composition can be greater than or equal to about 50 PPHR, about 55 PPHR, about 60 PPHR, about 65 PPHR, about 70 PPHR, about 75 PPHR, about 80 PPHR, about 85 PPHR, about 90 PPHR, about 95 PPHR, or about 100 PPHR of the composition. In some embodiments, the amount of at least one polypropylene and/or at least one polyethylene in a non-recycled layer can be at least about 50 wt %, about 60 wt %, about 65 wt %, about 70 wt %, about 75 wt %, about 80 wt %, about 85 wt %, or about 90 wt % of the non-recycled layer. In some embodiments, the amount of at least one polypropylene and/or at least one polyethylene in a non-recycled layer can be about 50-99 wt %, about 75-97.5 wt %, about 75-95 wt %, about 80-90 wt %, or about 82-87 wt % of the non-recycled layer. In addition, the compositions fed into the extruder to form the non-recycled layer(s) can be substantially free of recycled polyolefin material. The compositions fed into the extruder to form the non-recycled layer(s) can also be 100 wt. % virgin or non-recycled material.

Figure 11:
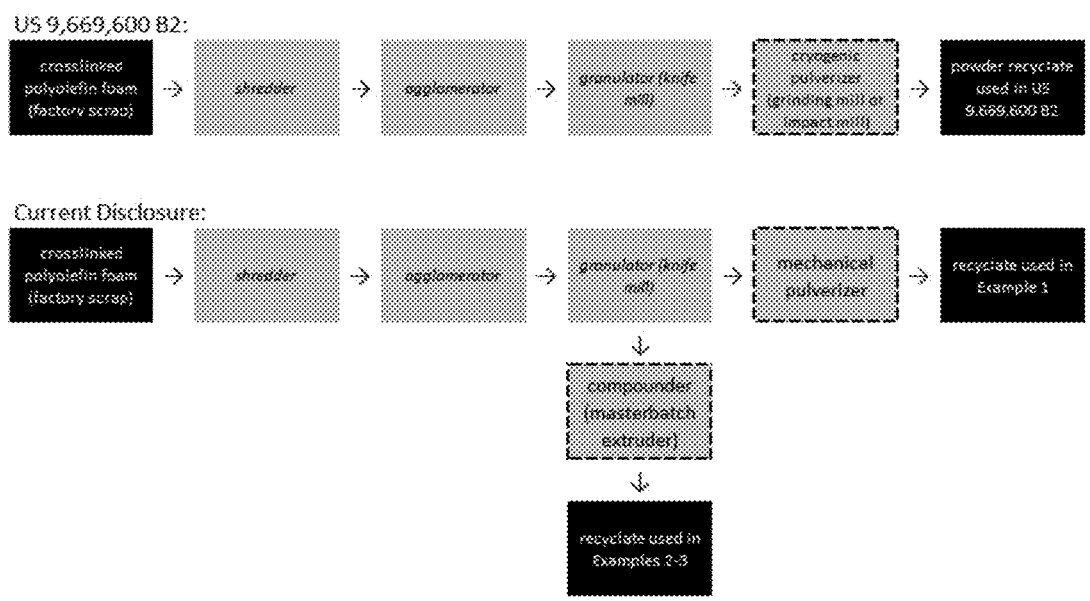
FIG. 11 is a flow chart illustrating the differences between the steps of preparing the recycled foam in U.S. Pat. No. 9,669,600 and the Examples of the present disclosure.

The compositions fed into the extruders to form the recycled layer(s) can include recycled material including, but not limited to, recycled polyolefin material, recycled metallized polyolefin material, recycled polyolefin film material, recycled polyolefin metallized film material, recycled polyolefin foam material, recycled polyolefin metallized foam material, or combinations thereof. The recycled crosslinked polyolefin foam material is different from the recycled crosslinked polyolefin foam material disclosed in U.S. Pat. No. 9,669,600 B2 in both how the material is prepared for recycling and the final forms. FIG. 11 illustrates the difference in how the factory scrap crosslinked polyolefin foam is prepared for recycling between the two disclosures. The method for recycling the crosslinked foam in the present disclosure can include four steps: shredding, agglomerating, granulating, and then either pulverizing or compounding.

In both disclosures, the foam sheet can first be shredded into small pieces to facilitate feeding the foam into an agglomerator. This can be necessary since foam sheets and foam rolls—even when unwound—can typically be too wide to be pulled in or drawn into commercial agglomerators intended for foam and plastic. Shredding the foam sheet can ensure that the material will not jam or block the agglomerator. Shredding the foam sheet can also help ensure a more uniform feed rate into the agglomerator, which then can ensure uniform output from the agglomerator. Shredded foam intended for agglomeration can vary in size depending on the recommendation of the equipment manufacturer, the feed rate of the materials to be agglomerated, the melting point of the materials to be agglomerated, etc. Shredded foam intended for agglomeration can generally be cut into pieces or "chips" from about 3 mm to about 20 mm wide. The shredder may be a separate piece of equipment in the process or may be in-line with the agglomerator, where the shredded foam can be fed directly into the agglomerator.

Agglomeration can involve densifying the shredded foam. Agglomerators may consist of a barrel, a conveying screw and/or rotor, and a die. As the shredded foam enters the barrel, a conveying screw and/or rotor can masticate the foam, breaking open the cells walls at the same time forming a densified material. This densification can be performed at a temperature near the melting point of the foam and the densification can be temperature controlled. A die at the back end of the barrel can form the densified material into a continuous strand as it exits the die. Depending on the system, cutting blades can then cut the strand into very course pieces to help facilitate transfer into a granulator.

Figure 3:
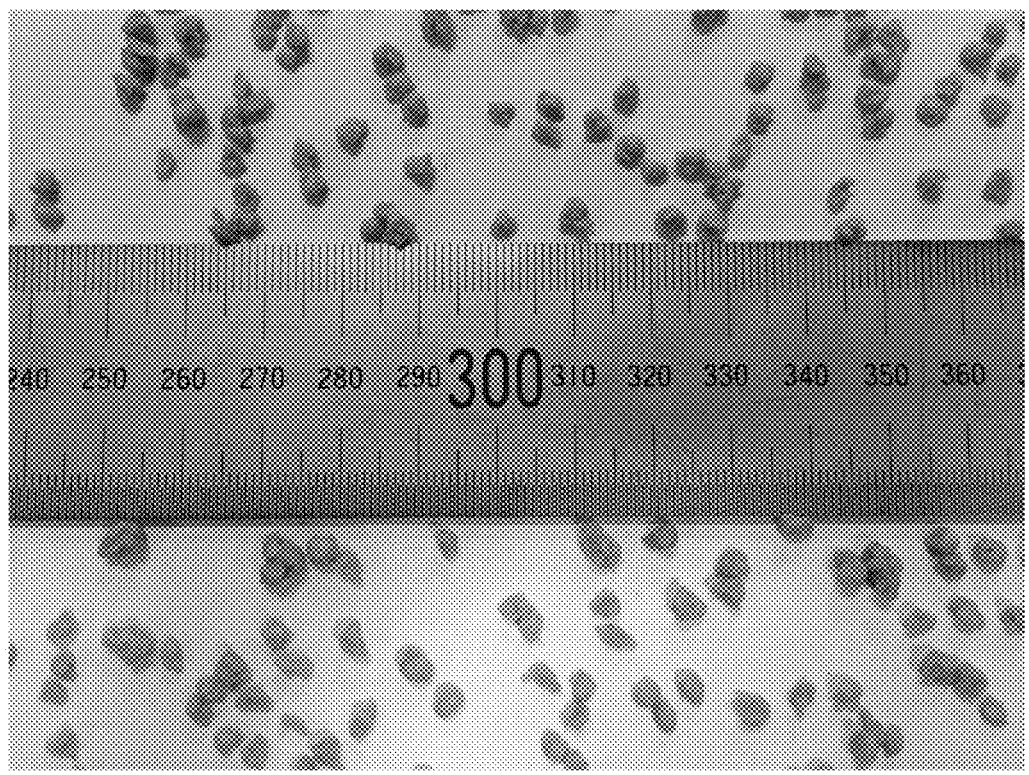
FIG. 3 is a photograph of the granulated 3-7 mm wide agglomerates used in producing the masterbatch which was then used to produce the multilayered foam structures of Example 2 and 3.
Figure 4:
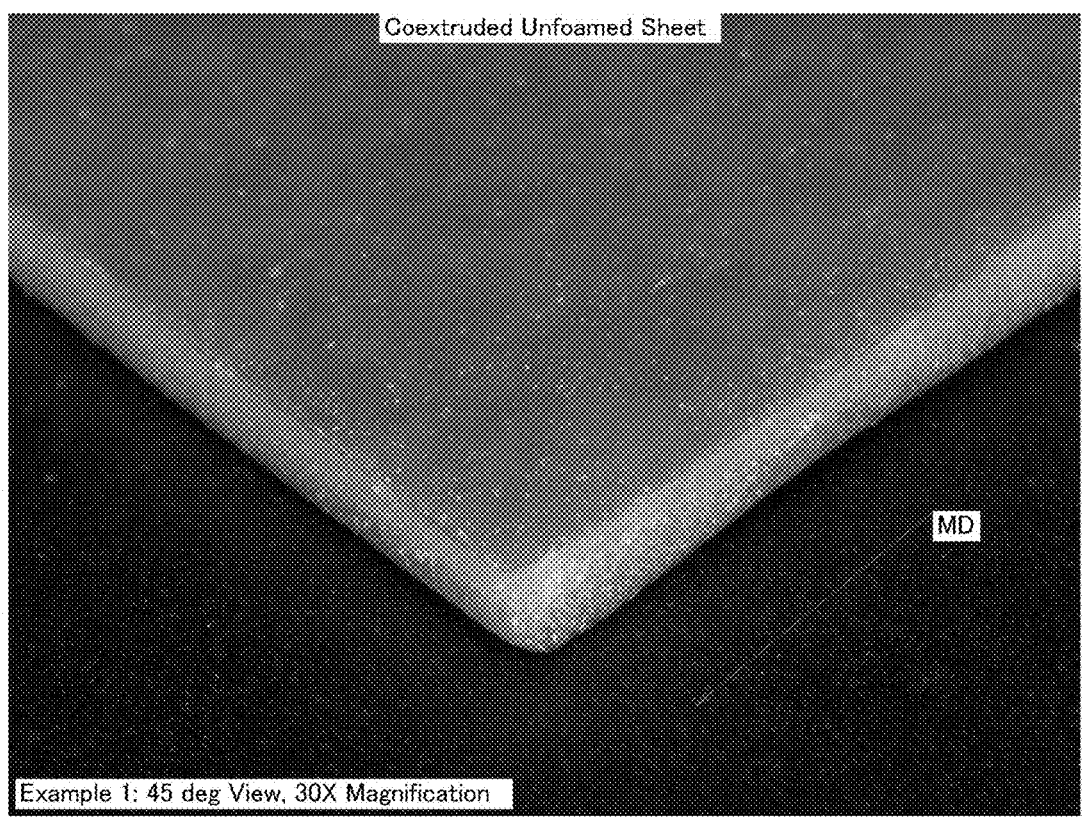
FIG. 4 is a photograph of the unfoamed sheet of Example 1 at 30× magnification and 45 degrees from the primary surface.
Figure 5:
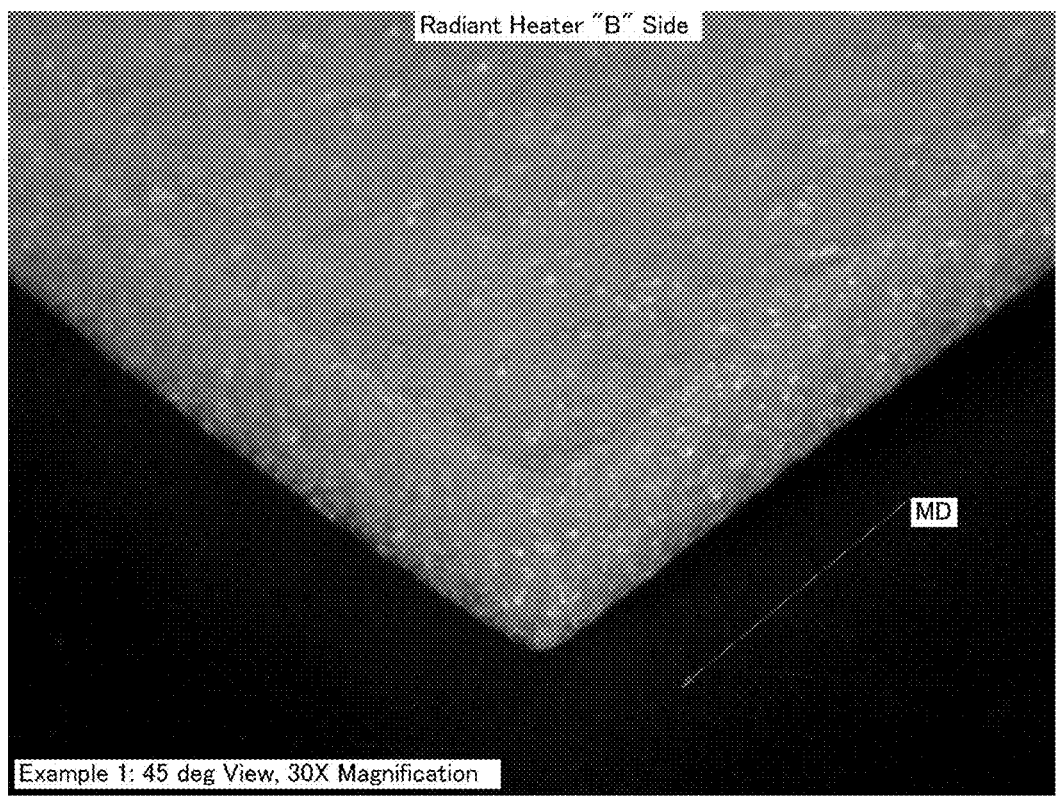
FIG. 5 is a photograph of the radiant heat foamed surface of Example 1 at 30× magnification and 45 degrees from primary surface.
Figure 6:
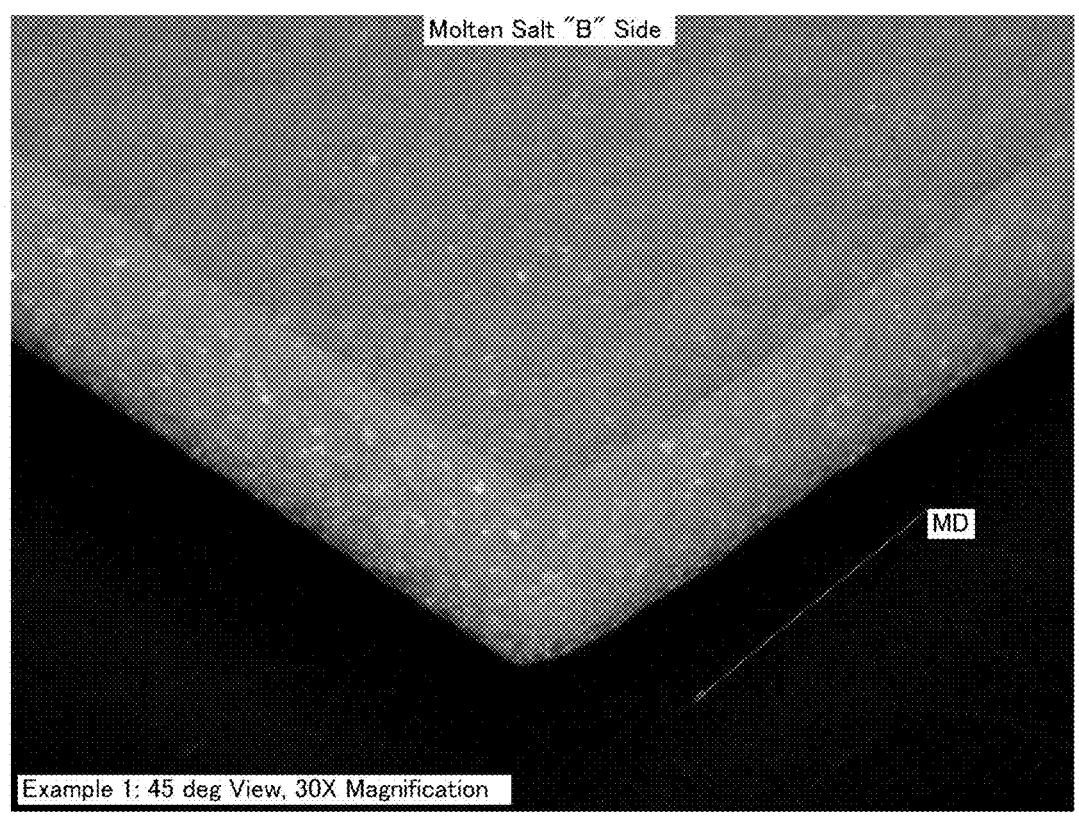
FIG. 6 is a photograph of the salt heated foam surface of Example 1 at 30× magnification and 45 degrees from primary surface.
Figure 7:
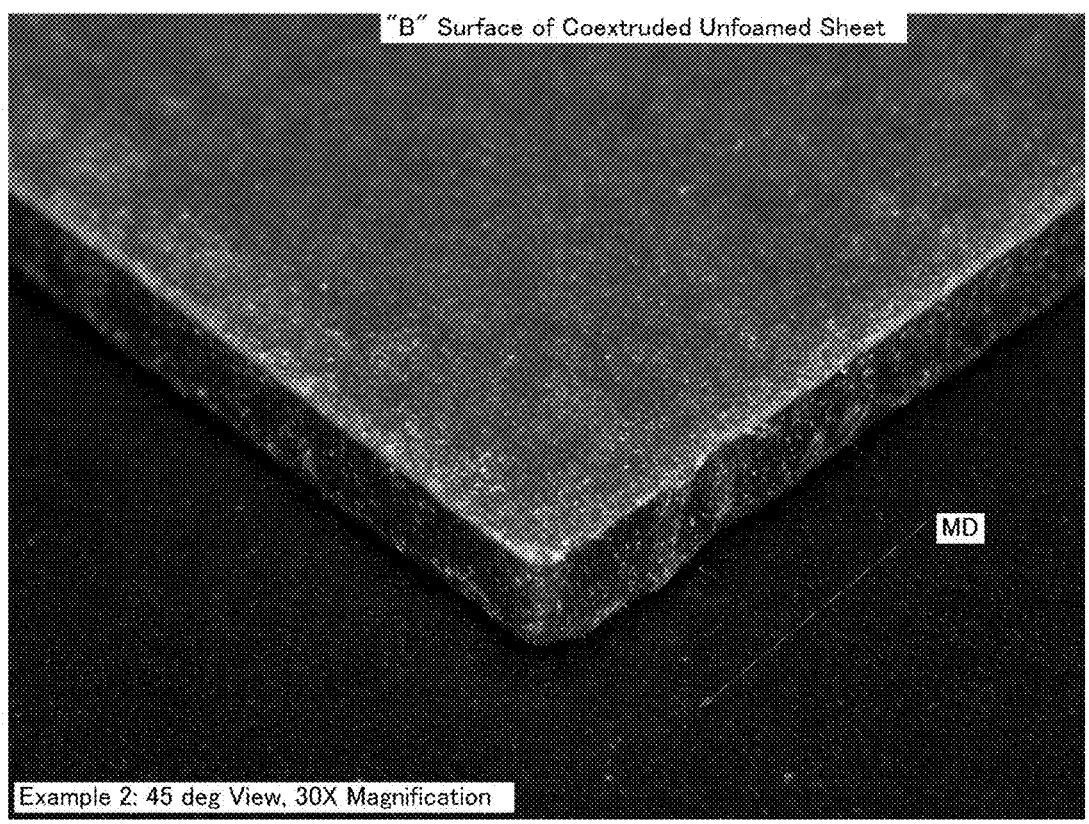
FIG. 7 is a photograph of the unfoamed sheet from surface B of Example 2 at 30× magnification and 45 degrees from the primary surface.
Figure 8:
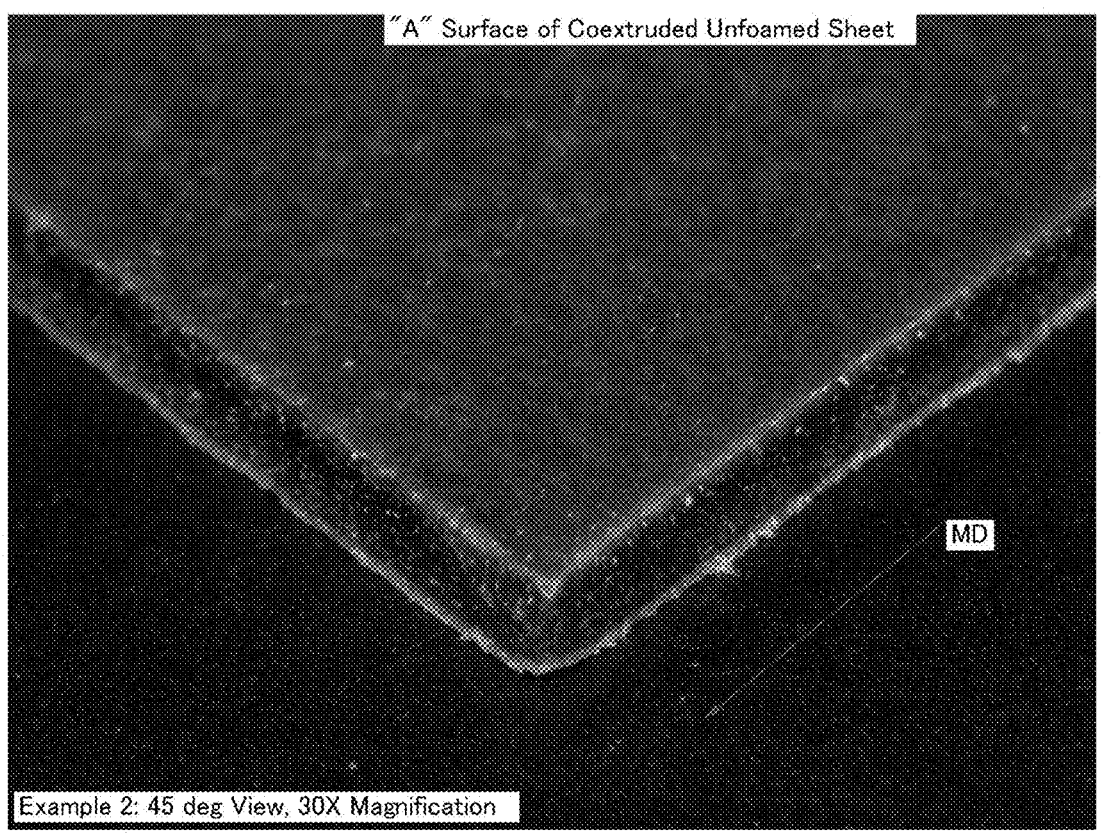
FIG. 8 is a photograph of the unfoamed sheet from surface A of Example 2 at 30× magnification and 45 degrees from the primary surface.
Figure 9:
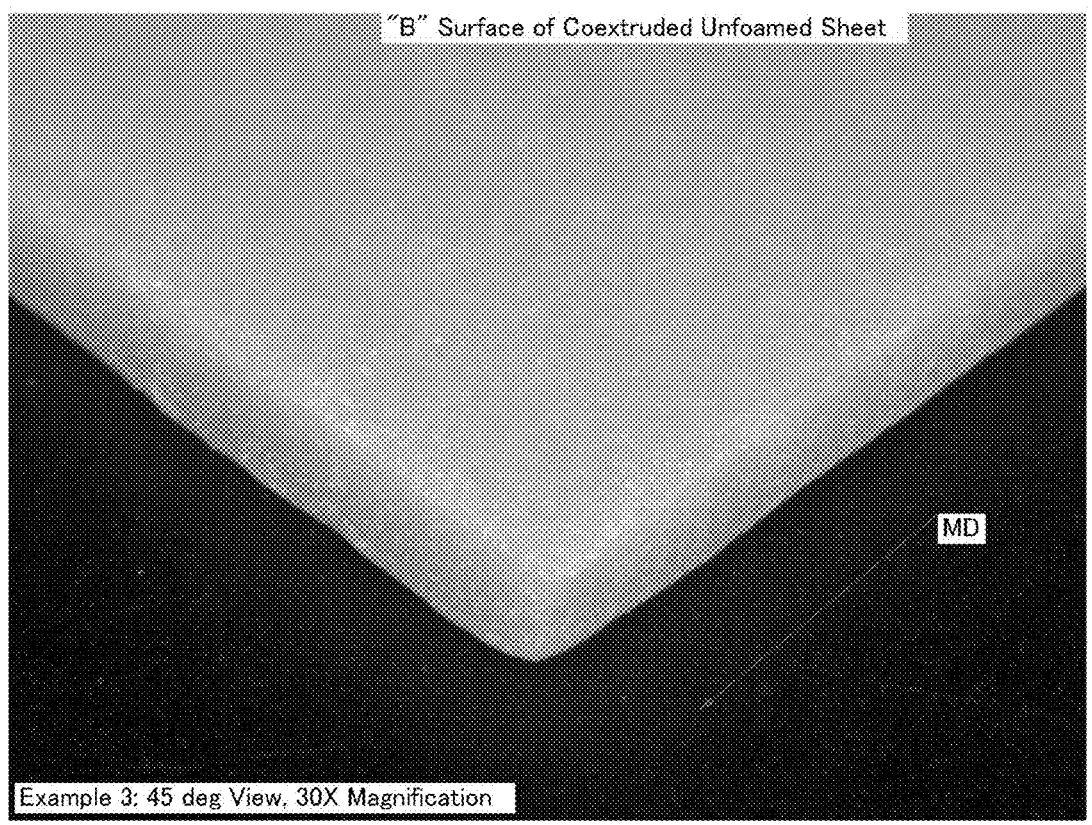
FIG. 9 is a photograph of the unfoamed sheet from surface B of Example 3 at 30× magnification and 45 degrees from the primary surface.
Figure 10:
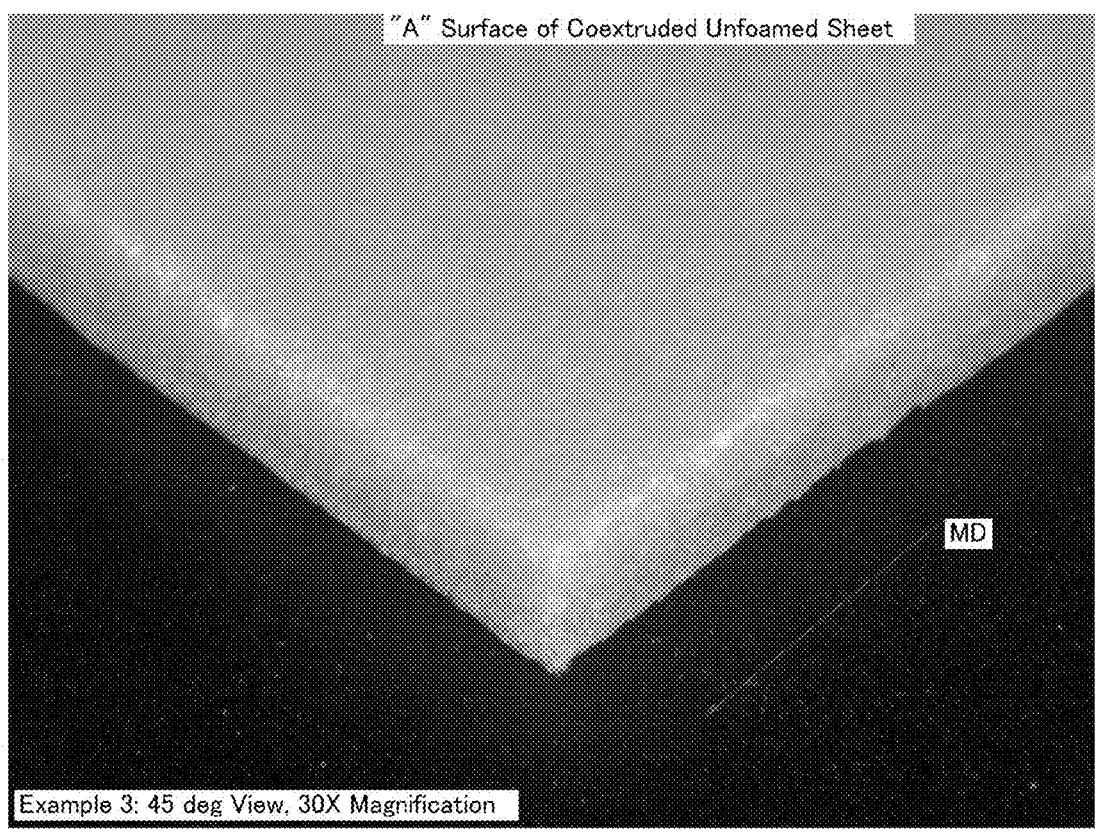
FIG. 10 is a photograph of the unfoamed sheet from surface A of Example 3 at 30× magnification and 45 degrees from the primary surface.

Granulators are essentially a series of rotating and stationary knives which can cut the very course agglomerated pieces into smaller about 1-10 mm, about 2-8 mm, or about 3-7 mm granules. The granules are sized so that they can be fed into typical polymer extrusion or injection molding equipment. Granulation may also be temperature controlled. FIG. 3 is a photograph of the granulated 3-7 mm wide agglomerates used in producing the masterbatch which was the used to produce the multilayered foam structures of Example 2 and 3.

Figure 2:
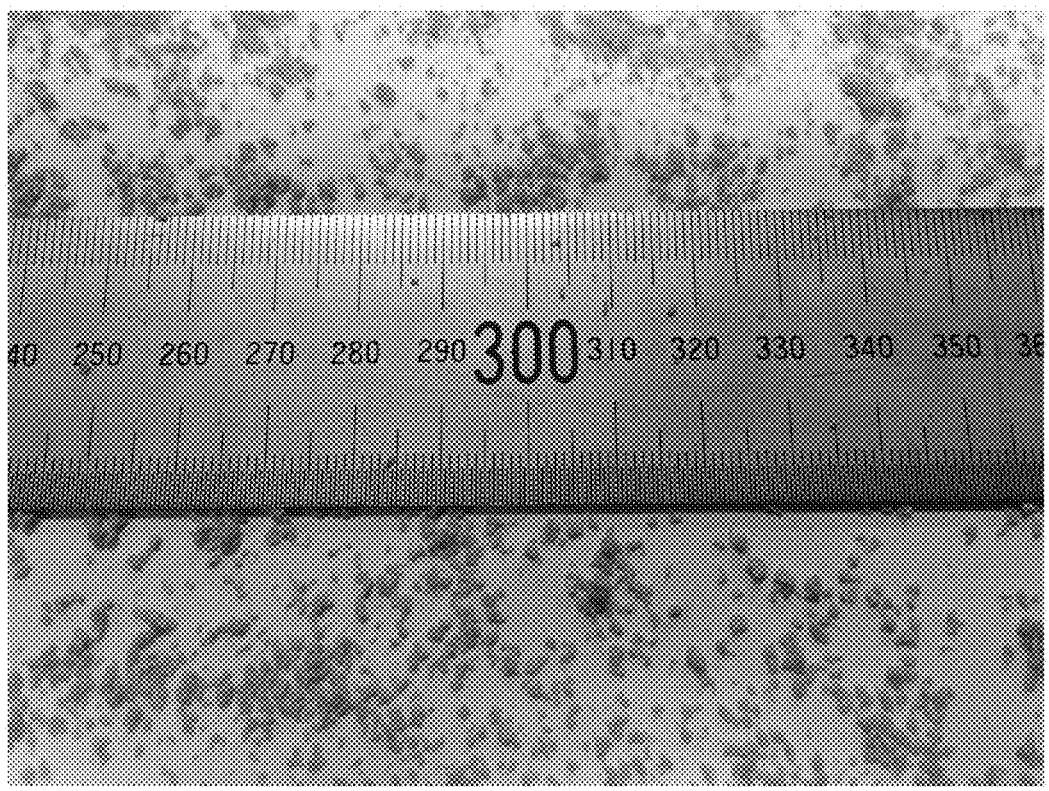
FIG. 2 is a photograph of mechanically pulverized, recycled crosslinked polyolefin foam used in producing Example 1.

The present foam recycling process varies from U.S. Pat. No. 9,669,600 B2 in the fourth step. Rather than cryogenically pulverizing the granules into a fine powder, the granules can be either a) mechanically pulverized at a temperature above cryogenic brittleness, or b) compounded into a masterbatch. Mechanical pulverizers—also called pulverizing mills—can further reduce the size of the granules. Variously designed pulverizing mills for plastics and foams are commercially available. Thru grinding, crushing, and/or cutting, a pulverizing mill can further reduce the granules. A sieve in the pulverizer ensures that the granules can be reduced to at least a maximum desired particle size. In Example 1 of the present disclosure, the recycled crosslinked polyolefin foam material can be pulverized down to particles from about 0.01-5 mm, about 0.1-4 mm, or 0.2-2 mm wide. FIG. 2 is a photograph of mechanically pulverized, recycled crosslinked polyolefin foam used in producing Example 1 of the present disclosure. Non-limiting examples of commercial systems which can shred crosslinked polyolefin foam, then agglomerate the foam, then granulate the agglomerate, and then mechanically pulverize the granules are available from Pallman Industries (Pallman Maschinenfabrik GmbH & Co. KG) and EREMA North America (EREMA Engineering Recycling Maschinen and Anlagen Ges.m.b.H.).

Alternatively, rather than pulverizing, the granules can be fed into a compounding extruder along with a polyolefin carrier resin (and any of the additives disclosed herein) to produce a masterbatch. It is believed that the kneading and high temperature processing of the granules in the compounding extruder can sufficiently reduce the granules to where they can be recycled into the disclosed foams. The masterbatch can be made from at least one polypropylene and/or polyethylene, the recycled granules, and/or any of the additives disclosed herein. In some embodiments, the masterbatch can be about 50-70 wt %, about 55-65 wt %, about 58-62 wt %, or about 60 wt % of at least one polypropylene and/or polyethylene. In some embodiments, the masterbatch can be about 30-50 wt %, about 35-45 wt %, about 38-42 wt %, or about 40 wt % of the recycled granules. In some embodiments, the remainder of the masterbatch can be any of the additives disclosed herein including an anti-oxidant. The masterbatch used to produce Examples 2-3 in the present disclosure was produced at a specific energy of 0.32 kW-hr/kg and at an extrusion melt temperature of 419° F.

In some embodiments, the amount of at least one polypropylene and/or at least one polyethylene in a recycled composition can be greater than or equal to about 50 PPHR, about 55 PPHR, about 60 PPHR, about 65 PPHR, about 70 PPHR, about 75 PPHR, about 80 PPHR, about 85 PPHR, about 90 PPHR, about 95 PPHR, or about 100 PPHR of the composition. In some embodiments, the amount of at least one polypropylene and/or at least one polyethylene in a recycled layer can be at least about 50 wt %, about 60 wt %, about 65 wt %, about 70 wt %, about 75 wt %, about 80 wt %, about 85 wt %, or about 90 wt % of the recycled layer. In some embodiments, the amount of at least one polypropylene and/or at least one polyethylene in a recycled layer can be about 50-99 wt %, about 75-97.5 wt %, about 75-95 wt %, about 75-90 wt %, or about 75-85 wt % of the recycled layer.

In some embodiments, the amount of recycled polyolefin foam material in a recycled composition can be less than or equal to about 25 PPHR, about 20 PPHR, about 10 PPHR, about 5 PPHR, or about 2.5 PPHR of the composition. In some embodiments, the amount of the recycled polyolefin foam material in a recycled layer can be at most about 25 wt %, about 20 wt %, about 15 wt %, about 10 wt %, about 5 wt %, about 2.5 wt %, or about 2 wt % of the recycled layer. In some embodiments, the amount of the recycled polyolefin foam material in a recycled layer can be about 1-25 wt %, about 2-25 wt %, about 2.5-25 wt %, about 1-15 wt %, about 2-15 wt %, about 2-10 wt %, or about 2-9 wt % of the recycled layer.

Since a broad range of multilayer structures and foam articles can be created with the disclosed compositions, a broad range of polypropylenes and/or polyethylenes can be employed in the compositions to meet various in-process manufacturing requirements and commercial end use requirements.

A non-limiting example of "polypropylene" is an isotactic homopolypropylene. Commercially available examples include, but are not limited to, FF018F from Braskem, 3271 from Total Petrochemicals, and COPYLENE™ CH020 from Conoco.

A non-limiting example of an "impact modified polypropylene" is a homopolypropylene with ethylene-propylene (EP) copolymer rubber. The rubber can be amorphous or semicrystalline but is not in sufficient quantities to render the material any plastomeric or elastomeric properties. A few non-limiting examples of commercially available "impact modified polypropylene" are TI4003F and TI4015F from Braskem and PRO-FAX® 8623 and PRO-FAX® SB786 from LyondellBasell.

"Polypropylene-ethylene copolymer" is polypropylene with random ethylene units. A few non-limiting examples of commercially available "polypropylene-ethylene copolymer" are 6232, 7250FL, and Z9421 from Total Petrochemicals, 6D20 and DS6D81 from Braskem. and PRO-FAX® RP311H and ADSYL™ 7415 XCP from LyondellBasell.

"Impact modified polypropylene-ethylene copolymer" is polypropylene with random ethylene units and with ethylene-propylene (EP) copolymer rubber. The rubber can be amorphous or semicrystalline, but is not in sufficient quantities to render the material any plastomeric or elastomeric properties. A non-limiting example of a commercially available impact modified polypropylene-ethylene copolymer is PRISMA® 6910 from Braskem.

"Metallocene polypropylene" is metallocene syndiotactic homopolypropylene, metallocene atactic homopolypropylene, and metallocene isotactic homopolypropylene. Non-limiting examples of "metallocene polypropylene" are those commercially available under the trade names METOCENE™ from LyondellBasell and ACHIEVE™ from ExxonMobil. Metallocene polypropylenes are also commercially available from Total Petrochemicals and include, but are not limited to, grades M3551, M3282MZ, M7672, 1251, 1471, 1571, and 1751.

"Metallocene polypropylene-ethylene copolymer" is metallocene syndiotactic, metallocene atactic, and metallocene isotactic polypropylene with random ethylene units. Commercially available examples include, but are not limited to, Lumicene® MR10MX0 and Lumicene® MR60MC2 from Total Petrochemicals and Purell® SM170G from LyondellBasell.

"Metallocene polypropylene olefin block copolymer" is a polypropylene with alternating crystallizable hard "blocks" and amorphous soft "blocks" that are not randomly distributed—that is, with a controlled block sequence. An example of "metallocene polypropylene olefin block copolymer" includes, but is not limited to, the INTUNE™ product line from the Dow Chemical Company.

"Polypropylene based polyolefin plastomer" (POP) and "polypropylene based polyolefin elastoplastomer" are both metallocene and non-metallocene propylene based copolymers with plastomeric and elastoplastomeric properties. Non-limiting examples are those commercially available under the trade name VERSIFY™ (metallocene) from the Dow Chemical Company, VISTAMAXX™ (metallocene) from ExxonMobil, and KOATTRO™ (non-metallocene) from LyondellBasell (a butene-1 based line of plastomeric polymers—certain grades are butene-1 homopolymer based and others are polypropylene-butene-1 copolymer based materials).

"Polypropylene based polyolefin elastomer" (POE) is both metallocene and non-metallocene propylene based copolymer with elastomeric properties. Non-limiting examples of propylene based polyolefin elastomers are those polymers commercially available under the trade names VERSIFY™ (metallocene) from the Dow Chemical Company and VISTAMAXX™ (metallocene) from ExxonMobil.

"Polypropylene based thermoplastic polyolefin blend" (TPO) is polypropylene, polypropylene-ethylene copolymer, metallocene homopolypropylene, and metallocene polypropylene-ethylene copolymer, which have ethylene-propylene copolymer rubber in amounts great enough to give the thermoplastic polyolefin blend (TPO) plastomeric, elastoplastomeric or elastomeric properties. Non-limiting examples of polypropylene based polyolefin blend polymers are those polymer blends commercially available under the trade names EXCELINK™ from JSR Corporation, THERMORUN™ and ZELAS™ from Mitsubishi Chemical Corporation, ADFLEX™ and SOFTELL™ from LyondellBasell, and TELCAR™ from Teknor Apex Company.

"Polypropylene based thermoplastic elastomer blend" (TPE) is polypropylene, polypropylene-ethylene copolymer, metallocene homopolypropylene, and metallocene polypropylene-ethylene copolymer, which have diblock or multiblock thermoplastic rubber modifiers (SEBS, SEPS, SEEPS, SEP, SERC, CEBC, HSB and the like) in amounts great enough to give the thermoplastic elastomer blend (TPE) plastomeric, elastoplastomeric, or elastomeric properties. Non-limiting examples of polypropylene based thermoplastic elastomer blend polymers are those polymer blends commercially available under the trade name GLS™ DYNAFLEX™ and GLS™ VERSAFLEX™ from Polyone Corporation, MONPRENE® from Teknor Apex Company, and DURAGRIP® from A. Schulman.

"VLDPE" and "VLLDPE" are very low density polyethylene and very linear density low density polyethylene containing an elastic or softening component, typically α-olefins of butene and/or hexene and/or octene. Non-limiting examples of VLDPE and VLLDPE are commercially available under the tradename FLEXOMER™ from the Dow Chemical Company and particular grades of STAMYLEX™ from Borealis.

"Metallocene polyethylene" is metallocene based polyethylene with properties ranging from non-elastic to elastomeric. Non-limiting examples of metallocene polyethylene are commercially available under the trade name ENGAGE™ from Dow Chemical Company, ENABLE™ and EXCEED™ from ExxonMobil, and QUEO™ from Borealis.

"Metallocene polyethylene olefin block copolymer" is a polyethylene with alternating crystallizable hard "blocks" and amorphous soft "blocks" that are not randomly distributed—that is, with a controlled block sequence. An example of "metallocene polyethylene olefin block copolymer" includes, but is not limited to, the INFUSE™ product line from the Dow Chemical Company.

These polyethylenes may also be copolymers and terpolymers containing acetate and/or ester groups. The comonomer groups include, but are not limited to, vinyl acetate, methyl acrylate, ethyl acrylate, butyl acrylate, glycidyl methacrylate, and acrylic acid. Non-limiting examples are commercially available under the tradename BYNEL®, ELVAX® and ELVALOY® from DuPont; EVATANE®, LOTADER®, and LOTRYL® from Arkema; ESCORENE™, ESCOR™, and OPTEMA™ from Exxon-Mobil.

The composition of any layer can contain at least one polypropylene having a melt flow index from about 0.1 to about 25 grams per 10 minutes at 230° C. and/or at least one polyethylene having a melt flow index from about 0.1 to about 25 grams per 10 minutes at 190° C. In some embodiments, the melt flow index of the polypropylene(s) and/or polyethylene(s) is preferably from about 0.3 to about 20 grams per 10 minutes at 230° C. and at 190° C., respectively, and more preferably from about 0.5 to about 15 grams per 10 minutes at 230° C. and at 190° C., respectively. The "melt flow index" (MFI) value for a polymer is defined and measured according to ASTM D1238 at 230° C. for polypropylenes and polypropylene based materials and at 190° C. for polyethylenes and polyethylene based materials using a 2.16 kg plunger for 10 minutes. The test time may be reduced for relatively high melt flow resins.

The MFI can provide a measure of flow characteristics of a polymer and is an indication of the molecular weight and processability of a polymer material. If the MFI values are too high, which corresponds to a low viscosity, extrusion according to the present disclosure cannot be satisfactorily carried out. Problems associated with MFI values that are too high include low pressures during extrusion, problems setting the thickness profile, uneven cooling profile due to low melt viscosity, poor melt strength, and/or machine problems. Problems with MFI values that are too low include high pressures during melt processing, sheet quality and profile problems, and higher extrusion temperatures which cause a risk of foaming agent decomposition and activation.

The above MFI ranges are also important for foaming processes because they can reflect the viscosity of the material and the viscosity has an effect on the foaming. Without being bound by any theory, it is believed there are several reasons why particular MFI values are far more effective. A lower MFI material may improve some physical properties as the molecular chain length is greater, creating more energy needed for chains to flow when a stress is applied. Also, the longer the molecular chain (MW), the more crystal entities the chain can crystallize thus providing more strength through intermolecular ties. However, at too low an MFI, the viscosity becomes too high. On the other hand, polymers with higher MFI values have shorter chains. Therefore, in a given volume of a material with higher MFI values, there are more chain ends on a microscopic level relative to polymers having a lower MFI, which can rotate and create free volume due to the space needed for such rotation (e.g., rotation occurring above the $T_g$, or glass transition temperature of the polymer). This can increase the free volume and enables an easy flow under stress forces.

In addition to the polymers, the compositions fed into the extruders may also contain additives compatible with producing the disclosed multilayered structures. Common additives include, but are not limited to, organic peroxides, antioxidants, lubricants, thermal stabilizers, colorants, flame retardants, antistatic agents, nucleating agents, plasticizers, antimicrobials, fungicides, light stabilizers, UV absorbents, anti-blocking agents, fillers, deodorizers, odor adsorbers, thickeners, cell size stabilizers, metal deactivators, and combinations thereof.

In some embodiments, the amount of additive(s) other than the chemical foaming agent(s) and the crosslinking promoter(s) in a composition can be less than or equal to about 20 PPHR, about 15 PPHR, about 10 PPHR, about 9 PPHR, about 8.5 PPHR, about 8 PPHR, about 7.5 PPHR, about 7 PPHR, about 6 PPHR, about 5 PPHR, or about 4 PPHR of the composition. In some embodiments, the amount of additive(s) other than the chemical foaming agent(s) and the crosslinking promoter(s) in a composition can be about 1-15 PPHR, about 5-10 PPHR, about 7-9 PPHR, or about 7.5-8.5 PPHR of the composition. In some embodiments, the amount of additive(s) other than the chemical foaming agent(s) and the crosslinking promoter(s) in a layer can be about 1-15 wt %, about 3-10 wt %, about 5-10 wt %, about 6-8 wt %, or about 6-7 wt % of the layer.

Regardless of how ingredients are fed into the extruders, the shearing force and mixing within an extruder can be sufficient to produce a homogenous layer. Co-rotating and counter-rotating twin screw extruders can provide sufficient shearing force and mixing thru the extruder barrel to extrude a layer with uniform properties.

Specific energy is an indicator of how much work is being applied during the extrusion of the ingredients for a layer and how intensive the extrusion process is. Specific energy is defined as the energy applied to a material being processed by the extruder, normalized to a per kilogram basis. The specific energy is quantified in units of kilowatts of applied energy per total material fed in kilograms per hour. Specific energy is calculated according to the formula:

$$\text{Specific Energy} = \frac{KW \text{ (applied)}}{\text{feedrate}\left(\frac{kg}{hr}\right)}, \text{ where}$$

$$KW \text{ (applied)} = \frac{KW \text{ (motor rating)} * (\% \text{ torque from maximum allowable in decimal form}) * RPM \text{ (actual running } RPM) * 0.97 \text{ (gearbox efficiency)}}{\text{Max } RPM \text{ (capability of extruder)}}$$

Specific energy is used to quantify the amount of shearing and mixing of the ingredients within the extruder. The extruders used to form the multilayer structures disclosed herein can be capable of producing a specific energy of at least about 0.090 kW·hr/kg, preferably at least about 0.105 kW·hr/kg, and more preferably at least about 0.120 kW·hr/kg.

Any layer can contain a chemical foaming agent (CFA) prior to foaming. The extrusion temperature for any foamable layer can be at least 10° C. below the thermal decomposition initiation temperature of the chemical foaming agent. If the extrusion temperature exceeds the thermal decomposition temperature of the foaming agent, then the foaming agent will decompose, resulting in undesirable "prefoaming." The extrusion temperature for any layer can be at least 10° C. below the thermal decomposition initiation temperature of the chemical foaming agent in any foamable layer adjacent to the layer. If the extrusion temperature of the layer exceeds the thermal decomposition temperature of the foaming agent in the adjacent layer, then the foaming agent in the adjacent layer can decompose, also resulting in undesirable "prefoaming."

The foam composition can include a variety of different chemical foaming agents. Examples of chemical foaming agents include, but are not limited to, azo compounds, hydrazine compounds, carbazides, tetrazoles, nitroso compounds, and carbonates. In addition, a chemical foaming agent may be employed alone or in any combination. One chemical foaming agent that can be used in some embodiments is azodicarbonamide (ADCA). ADCA's thermal decomposition typically occurs at temperatures between about 190 to 230° C. In order to prevent ADCA from thermally decomposing in the extruder, extruding temperature can be maintained at or below 190° C.

The amount of chemical foaming agent in a composition can be less than or equal to about 40 PPHR, about 30 PPHR, about 20 PPHR, about 15 PPHR, about 10 PPHR, or about 8 PPHR of the composition. In some embodiments, the amount of chemical foaming agent in a composition can be about 1-20 PPHR, about 2-15 PPHR, about 5-10 PPHR, or about 6-8 PPHR of the composition. In some embodiments, the amount of chemical foaming agent in a layer can be about 1-20 wt %, about 2-15 wt %, about 5-10 wt %, about 6-8 wt %, or about 6-7 wt %. The amount of chemical foaming agent can depend on the unfoamed sheet thickness, desired foam thickness, desired foam density, materials being extruded, crosslinking percentage, type of chemical foaming agent (different foaming agents can generate significantly different quantities of gas), among others.

Note that the above listed amounts of chemical foaming agent can be specific to ADCA only. Other foaming agents can produce varying amounts of volumetric gas per mass of CFA and can be considered accordingly. For example, when comparing ADCA to the chemical foaming agent p-toluenesulfonyl semicarbazide (TSS): if a foamable layer contains 40 PPHR ADCA, about 63 PPHR TSS would be required to generate about the same amount gas during the foaming step.

If the difference between the decomposition temperature of the thermally decomposable foaming agent and the melting point of the polymer with the highest melting point is high, then a catalyst for foaming agent decomposition may be used. Exemplary catalysts include, but are not limited to, zinc oxide, magnesium oxide, calcium stearate, glycerin, and urea. The lower temperature limit for extrusion can be that of the polymer with the highest melting point. If the extrusion temperature drops below the melting temperature of the polymer with the highest melting point, then undesirable "unmelts" appear. Upon foaming, the extruded layer that was extruded below this lower temperature limit can exhibit uneven thickness, a non-uniform cell structure, pockets of cell collapse, and other undesirable attributes.

Extruding an unfoamed multilayer sheet—versus extruding a foamed multilayer sheet (commonly referred to as "extrusion foaming")—are vastly different. Extrusion foaming can be performed with a physical foaming agent, a chemical foaming agent, or a mixture of physical and chemical. Physical foaming agents can be inorganic and organic gases (nitrogen, carbon dioxide, pentane, butane, etc.) that are injected under high pressure directly into the polymer melt. The gases can nucleate and expand as the polymer melt exits the extrusion die to create the foamed polymer. Chemical foaming agents—such as the examples previously described—can be solids that decompose exothermally or endothermally upon a decomposition temperature to produce gases. Typical gases generated from chemical foaming agents include nitrogen, carbon monoxide, carbon dioxide, ammonia, etc. To extrusion foam a chemical foaming agent, the chemical foaming agent can be dispersed in the polymer melt and the melt heated to above the decomposition temperature of the chemical foaming agent while still in the extruder and die. A foamed polymer can be made as the polymer melt exits the extrusion die.

Regardless whether the foaming agents are physical, chemical, or combinations, typical extrusion foaming generates polymer sheets where both primary surfaces are significantly rougher than equivalent structures produced in the disclosed method. The surface profile of a multilayer (as well as single layer) foam sheet can be critical in many applications and thus extrusion foamed sheets may not be used for these applications. These applications can require a smooth foam surface to obtain desired properties such as ease of lamination to a film, fabric, fiber layer, and a leather; percentage contact area in the lamination; visual aesthetics; etc. U.S. Pat. No. 9,669,600, which is hereby incorporated by reference in its entirety, includes examples illustrating the difference in surface roughness between extrusion foamed polymer sheets and equivalent foamed polymer sheets produced by the disclosed method.

The rougher surfaces of extrusion foamed articles can be generally caused by larger sized cells (when compared to the foams produced according to the present disclosure). Although the cell size and size distribution may not be as critical in most commercial applications, because surface roughness is a function of cell size, foams with larger cells can be less desirable than foams with smaller cells for applications requiring a smooth foam surface.

The thickness of the unfoamed, coextruded multilayer structure can be about 0.1 to about 30 mm, about 0.2 to about 25 mm, about 0.3 to about 20 mm, or about 0.4 to about 15 mm. Any individual A or B layer can have a thickness of at least about 0.05 mm, at least about 0.1 mm, at least about 0.15 mm, and at least about 0.2 mm. In some embodiments, an unfoamed recycled layer can have a thickness between about 0.5-5 mm, about 1-4 mm, about 1-2 mm, or about 1-1.5 mm. In some embodiments, an unfoamed nonrecycled layer can have a thickness between about 50-300 microns or about 100-250 microns.

After the coextruded sheet has been produced (e.g., by two extruders), the extruded multilayered sheet can be subjected to irradiation with ionizing radiation at a given exposure to crosslink the composition of the multilayered sheet, thereby obtaining an irradiated, crosslinked multilayer structure. Ionizing radiation is often unable to produce a sufficient degree of crosslinking on polypropylene(s), polypropylene based materials, some polyethylene(s), and some polyethylene based materials. Thus, a crosslinking promoter can be added to the compositions that are fed into the extruders to promote crosslinking. Polymers crosslinked by ionizing radiation are commonly referred to as "physically crosslinked".

It is important to distinguish between "physical" crosslinking and "chemical" crosslinking. In chemical crosslinking, the crosslinks are generated with crosslinking promoters but without the use or ionizing radiation. Chemical crosslinking typically involves using either peroxides, silanes, or vinylsilanes. In peroxide crosslinking processes, the crosslinking typically occurs in the extrusion die. For silane and vinylsilane crosslinking processes, the crosslinking typically occurs post extrusion in a secondary operation where the crosslinking of the extruded material is accelerated with heat and moisture. Regardless of the chemical crosslinking method, chemically crosslinked foam sheets typically exhibit primary surfaces that are significantly rougher than equivalent structures produced in the disclosed method. The surface profile of a multilayer (as well as single layer) foam sheet can be critical in many applications and thus chemically crosslinked foam sheets may not be used for these applications. These applications can require a smooth foam surface to obtain desired properties such as ease of lamination to a film, fabric, fiber layer, and a leather; percentage contact area in the lamination; visual aesthetics; etc. U.S. Pat. No. 9,669,600 includes examples illustrating the difference in surface roughness between chemically crosslinked foamed polymer sheets and equivalent foamed polymer sheets produced by the disclosed method.

The rougher surfaces of chemically crosslinked foamed articles can be generally caused by larger sized cells (when compared to the foams produced according to the present disclosure). Although the cell size and size distribution is not critical in most commercial applications, because surface roughness is a function of cell size, foams with larger cells can be less desirable than foams with smaller cells for applications requiring a smooth foam surface.

Examples of ionizing radiation include, but are not limited to, alpha, beta (electron beams), x-ray, gamma, and neutron. Among them, an electron beam having uniform energy can be used to prepare the crosslinked polyolefin structure. Exposure time, frequency of irradiation, and acceleration voltage upon irradiation with an electron beam can vary widely depending on the intended crosslinking degree and the thickness of the multilayered structure. However, the ionizing radiation can generally be in the range of from about 10 to about 500 kGy, about 20 to about 300 kGy, or about 20 to about 200 kGy. If the exposure is too low, then cell stability may not be maintained upon foaming. If the exposure is too high, the moldability of the resulting multilayered foam structure may be poor. Moldability is a desirable property when the multilayered foam sheet is used in thermoforming applications. Also, the unfoamed sheet may be softened by exothermic heat release upon exposure to the electron beam radiation such that the structure can deform when the exposure is too high. In addition, the polymer components may also be degraded from excessive polymer chain scission.

The coextruded unfoamed multilayered sheet may be irradiated up to 4 separate times, preferably no more than twice, and more preferably only once. If the irradiation frequency is more than about 4 times, the polymer components may suffer degradation so that upon foaming, for example, uniform cells will not be created in the resulting foam layer(s). When the thickness of the extruded structure is greater than about 4 mm, irradiating each primary surface of the multilayered profile with an ionized radiation can be preferred to make the degree of crosslinking of the primary surface(s) and the inner layer more uniform.

Irradiation with an electron beam provides an advantage in that coextruded sheets having various thicknesses can be effectively crosslinked by controlling the acceleration voltage of the electrons. The acceleration voltage can generally be in the range of from about 200 to about 1500 kV, about 400 to about 1200 kV, or about 600 to about 1000 kV. If the acceleration voltage is less than about 200 kV, then the radiation may not reach the inner portion of the coextruded sheets. As a result, the cells in the inner portion can be coarse and uneven on foaming. Additionally, acceleration voltage that is too low for a given thickness profile can cause arcing, resulting in "pinholes" or "tunnels" in the foamed structure. On the other hand, if the acceleration voltage is greater than about 1500 kV, then the polymers may degrade.

Regardless of the type of ionizing radiation selected, crosslinking is performed so that the composition of the extruded structure is crosslinked about 20 to about 75% or about 30 to about 60%, as measured by the "Toray Gel Fraction Percentage Method." According to the "Toray Gel Fraction Percentage Method," tetralin solvent is used to dissolve non-crosslinked components in a composition. In principle, the non-crosslinked material is dissolved in tetralin and the crosslinking degree is expressed as the weight percentage of crosslinked material in the entire composition. The apparatus used to determine the percent of polymer crosslinking includes: 100 mesh (0.0045 inch wire diameter); Type 304 stainless steel bags; numbered wires and clips; a Miyamoto thermostatic oil bath apparatus; an analytical balance; a fume hood; a gas burner; a high temperature oven; an anti-static gun; and three 3.5 liter wide mouth stainless steel containers with lids. Reagents and materials used include tetralin high molecular weight solvent, acetone, and silicone oil. Specifically, an empty wire mesh bag is weighed and the weight recorded. For each sample, 100 milligrams±5 milligrams of sample is weighed out and transferred to the wire mesh bag. The weight of the wire mesh bag and the sample, typically in the form of thinly sliced foam cuttings, is recorded. Each bag is attached to the corresponding number wire and clips. When the solvent temperature reaches 130° C., the bundle (bag and sample) is immersed in the solvent. The samples are shaken up and down about 5 or 6 times to loosen any air bubbles and fully wet the samples. The samples are attached to an agitator and agitated for three (3) hours so that the solvent can dissolve the foam. The samples are then cooled in a fume hood. The samples are washed by shaking up and down about 7 or 8 times in a container of primary acetone. The samples are washed a second time in a second acetone wash. The washed samples are washed once more in a third container of fresh acetone as above. The samples are then hung in a fume hood to evaporate the acetone for about 1 to about 5 minutes. The samples are then dried in a drying oven for about 1 hour at 120° C. The samples are cooled for a minimum of about 15 minutes. The wire mesh bag is weighed on an analytical balance and the weight is recorded. Crosslinking is then calculated using the formula $100*(C-A)/(B-A)$, where A=empty wire mesh bag weight; B=wire bag weight+foam sample before immersion in tetralin; and C=wire bag weight+dissolved sample after immersion in tetralin.

Suitable crosslinking agents include, but are not limited to, commercially available difunctional, trifunctional, tetrafunctional, pentafunctional, and higher functionality monomers. Such crosslinking monomers are available in liquid, solid, pellet, and powder forms. Examples include, but are not limited to, acrylates or methacrylates such as 1,6-hexanediol diacrylate, 1,6-hexanediol dimethacrylate, ethylene glycol diacrylate, ethylene glycol dimethacrylate, trimethylol propane trimethacrylate, tetramethylol methane triacrylate, 1,9-nonanediol dimethacrylate and 1,10-decanediol dimethacrylate; allyl esters of carboxylic acid (such as trimellitic acid triallyl ester, pyromellitic acid triallyl ester, and oxalic acid diallyl ester); allyl esters of cyanulic acid or isocyanulic acid such as triallyl cyanurate and triallyl isocyanurate; maleimide compounds such as N-phenyl maleimide and N,N'-m-phenylene bismaleimide; compounds having at least two tribonds such as phthalic acid dipropagyl and maleic acid dipropagyl; and divinylbenzene. Additionally, such crosslinking agents may be used alone or in any combination. Divinylbenzene (DVB), a difunctional liquid crosslinking monomer, can be used as a crosslinking agent in the present disclosure.

The amount of crosslinking agent in a composition can be less than or equal to about 4 PPHR, about 3 PPHR, about 2.5 PPHR, about 2 PPHR, about 1.5 PPHR, about 1 PPHR, or about 0.5 PPHR of the composition. In some embodiments, the amount of crosslinking agent in a composition can be about 0.1-5 PPHR, about 0.5-3 PPHR, about 1-3 PPHR, or about 2-3 PPHR of the composition. In some embodiments, the amount of crosslinking agent in a layer can be about 0.5-5 wt %, about 1-3 wt %, or about 1.5-2.5 wt % of the layer.

Note that the above listed amounts of crosslinking agent can be specific to DVB only. Other crosslinking agents can be more or less efficient in crosslinking than DVB. Thus, the required quantity for another crosslinking agent should be considered accordingly. Crosslinking agents vary in crosslinking efficiency from, but not limited to, the ionizing radiation dosage, the polymers being crosslinked, the chemical structure of the monomer, the number of functional groups on the monomer, and whether the monomer is a liquid or a powder.

Crosslinks may be generated using a variety of different techniques and can be formed both intermolecularly, between different polymer molecules, and intramolecularly, between portions of a single polymer molecule. Such techniques include, but are not limited to, providing crosslinking agents which are separate from a polymer chain and providing polymer chains which incorporate a crosslinking agent containing a functional group which can form a crosslink or be activated to form a crosslink.

After irradiating the coextruded sheet, foaming may be accomplished by heating the crosslinked multilayered sheet to a temperature higher than the decomposition temperature of the thermally decomposable blowing agent. The foaming can be performed at about 200-260° C. or about 220-240° C. in a continuous process. A continuous foaming process can be preferred over a batch process for production of a continuous foam sheet.

The foaming can be typically conducted by heating the crosslinked multilayered sheet with molten salt, radiant heaters, vertical or horizontal hot air oven, microwave energy, or a combination of these methods. The foaming may also be conducted in an impregnation process using, for example, nitrogen in an autoclave, followed by a free foaming via molten salt, radiant heaters, vertical or horizontal hot air oven, microwave energy, or a combination of these methods. Optionally, before foaming, the crosslinked multilayered sheet can be softened with preheating. This can help stabilize the expansion of the structure upon foaming—particularly with thick and stiff sheets.

The density of the multilayered foam sheet can be defined and measured using section or "overall" density, rather than a "core" density, as measured by JIS K6767. The multilayered foam sheets produced using the above described method can yield foams with a section, or "overall" density of about 20-250 kg/m$^3$, about 30-125 kg/m$^3$, about 50-100 kg/m$^3$, or about 50-80 kg/m$^3$. The section density can be controlled by the amount of blowing agent and the thickness of the extruded structure. If the density of the multilayered foam sheet is less than about 20 kg/m$^3$, then the sheet may not foam efficiently due to a large amount of chemical blowing agent needed to attain the density. Additionally, if the density of the sheet is less than about 20 kg/m$^3$, then the expansion of the sheet during the foaming step may become increasingly difficult to control. Furthermore, if the density of the multilayered foam sheet is less than about 20 kg/m$^3$, then the foam may become increasingly prone to cell collapse. Thus, it may be difficult to produce a multilayered foam sheet of uniform section density and thickness at a density less than about 20 kg/m$^3$.

The multilayered foam sheet is not limited to a section density of about 250 kg/m$^3$. A foam with a section density of about 350 kg/m$^3$, about 450 kg/m$^3$, or about 550 kg/m$^3$ may also be produced. However, it may be preferred that the foam sheet have a density of less than about 250 kg/m$^3$ since greater densities can be generally cost prohibitive when compared to other materials which can be used in a given application.

The foam layers produced using the above method may have closed cells. Preferably, at least 90% of the cells have undamaged cell walls, preferably at least 95%, and more preferably more than 98%. The average cell size can be from about 0.05 to about 1.0 mm, and preferably from about 0.1 to about 0.7 mm. If the average cell size is lower than about 0.05 mm, then the density of the foam structure can typically be greater than 250 kg/m$^3$. If the average cell size is larger than 1 mm, the foam may have an uneven surface. There is also a possibility of the foam structure being undesirably torn if the population of cells in the foam does not have the preferred average cell size. This can occur when the foam structure is stretched or portions of it are subjected to a secondary process. The cell size in the foam layer(s) may have a bimodal distribution representing a population of cells in the core of the foam structure which are relatively round and a population of cells in the skin near the surfaces of the foam structure which are relatively flat, thin, and/or oblong.

The overall thickness of the foamed multilayered structure can be about 0.2 mm to about 50 mm, about 0.4 mm to about 40 mm, about 0.6 mm to about 30 mm, about 0.8 mm to about 20 mm, about 0.2-5 mm, about 0.5-3 mm, about 1-4 mm, or about 2-4 mm. If the thickness is less than about 0.2 mm, then foaming may not be efficient due to significant gas loss from the primary surface(s). If the thickness is greater than about 50 mm, expansion during the foaming step can become increasingly difficult to control. Thus, it can be increasingly more difficult to produce a multilayered structure (with recycled polyolefin foam material) with uniform section density and thickness. In some embodiments, a nonrecycled layer of the foamed, coextruded multilayer structure can have a thickness of about 1-100 microns, about 5-50 microns, about 10-30 microns, about 15-25 microns, or about 16-20 microns. In some embodiments, a recycled layer of the foamed, coextruded multilayer structure can have a thickness of about 2.7-3.3 mm.

In some embodiments, the desired thickness can be obtained by a secondary process such as slicing, skiving, or bonding. Slicing, skiving, or bonding can produce a thickness range of about 0.1 mm to about 100 mm.

The disclosed multilayered structures can be used in a variety of applications. One such application is foam tapes and gasketing. Closed cell foam tape is commonly used in areas such as window glazing, where strips of foam tape are placed between two window panes to seal the air between the glass. This can improve the thermal insulation property of the window. The foam can also act as a cushion for the glass panes from the effects of thermal expansion and contraction of the building and window frame from daily and seasonal temperature changes. Likewise, closed cell foam gaskets are commonly used for sealing and cushioning. Handheld electronic devices and household appliances are two examples that may contain foam gaskets. A soft, flexible foam sheet can be usually suited as a tape or gasket.

When the multilayer foam structure is to be used as a tape or gasket, a pressure sensitive adhesive layer may be disposed on at least a portion of one or both major surfaces. Any pressure sensitive adhesive known in the art may be used. Examples of such pressure sensitive adhesives include, but are not limited to, acrylic polymers, polyurethanes, thermoplastic elastomers, block copolymers, polyolefins, silicones, rubber based adhesives, copolymers of ethylhexylacrylate and acrylic acid, copolymers of isooctyl acrylate and acrylic acid, blends of acrylic adhesives and rubber based adhesives as well as combinations of the foregoing.

The multilayer foam structures can also be thermoformed. To thermoform the multilayer foam structure, the foam can be heated to the melting point of the polyolefin blend for all the layers in the multilayer foam structure. If any layer has immiscible polymers, the multilayer foam structure may exhibit more than one melting point. In this case, the multilayer foam structure can typically be thermoformed when the foam is heated to a temperature midway between the multilayer composition's lowest melting point and highest melting point. In addition, the multilayer foam structure can be thermoformed onto a substrate such as a hard polypropylene, ABS, or wood fiber composite. Preferably, the multilayer foam structure can be thermoformed onto the substrate such that a side of a non-recycled foam layer of the multilayer foam is applied to the substrate. The substrate itself can also be thermoformed at the same time as the multilayer foam structure. In addition, the substrate can be applied to a side (i.e., surface) of a non-recycled foam layer of the multilayer foam. One example of a thermoformed article is an automobile air duct. A closed cell foam structure can be particularly suited for this application due to its lower weight (when compared to solid plastic), its insulating properties that help maintain the temperature of the air flowing thru the duct, and its resistance to vibration (versus solid plastic). Thus, a firm multilayer foam structure can be suitable for an automobile air duct.

In some embodiments, the multilayer foam structures can be laminates containing the multilayer foam and a laminate layer. Preferably, the laminate layer can be applied to a side (i.e., surface) of a non-recycled foam layer of the multilayer foam. In these laminates, the multilayer foam structure can, for example, be combined with a film and/or foil. Examples of suitable materials for such layers include, but are not limited to, polyvinyl chloride (PVC); thermoplastic polyolefin (TPO); thermoplastic urethane (TPU); fabrics such as polyester, polypropylene, cloth and other fabrics; leather and/or fiber layers such as non-wovens. Such layers may be manufactured using standard techniques that are well known to those of ordinary skill in the art. Importantly, the multilayer foam of the disclosure may be laminated on one or both sides with these materials and may include multiple other layers. If the multilayer foam is laminated on both sides, preferably these laminate layers can be applied to sides of non-recycled foam layers of the multilayer foam. In these laminates, a layer may be joined to an adjacent layer by means of chemical bonds, mechanical means, or combinations thereof. Adjacent laminate layers may also be affixed to each other by any other means including the use of attractive forces between materials having opposite electromagnetic charges or attractive forces present between materials which both have either a predominantly hydrophobic character or a predominantly hydrophilic character.

In some embodiments, the multilayer foam structures or laminates can be used in automobile interior parts such as door panels, door rolls, door inserts, door stuffers, trunk stuffers, armrests, center consoles, seat cushions, seat backs, headrests, seat back panels, instrument panels, knee bolsters, or a headliner. These multilayer foam structures or laminates can also be used in furniture (e.g., commercial, office, and residential furniture) such as chair cushions, chair backs, sofa cushions, sofa trims, recliner cushions, recliner trims, couch cushions, couch trim, sleeper cushions, or sleeper trims. These multilayer foam laminates or structures can also be used in walls such as modular walls, moveable walls, wall panels, modular panels, office system panels, room dividers, or portable partitions. The multilayer foam laminates or structures can also be used in storage casing (e.g., commercial, office and residential) which can be either mobile or stationary. Furthermore, the multilayer foam laminates and structures can also be used in coverings such as chair cushion coverings, chair back coverings, armrest coverings, sofa coverings, sofa cushion coverings, recliner cushion coverings, recliner coverings, couch cushion coverings, couch coverings, sleeper cushion coverings, sleeper coverings, wall coverings, and architectural coverings.

Some embodiments include a first layer of the disclosed multilayer foam structure and a second layer selected from the group consisting of a solid hardwood floor panel, an engineered wood floor panel, a laminate floor panel, a vinyl floor tile, a ceramic floor tile, a porcelain floor tile, a stone floor tile, a quartz floor tile, a cement floor tile, and a concrete floor tile. As stated above, preferably the second layer(s) can be applied to a side (i.e., surface) of the non-recycled layer(s) of the multilayer foam structure. In these laminates, the first layer may be joined to the adjacent panel or tile by means of chemical bonds, mechanical means, or a combination thereof. The adjacent laminate layers may also be affixed to each other by any other means including the use of attractive forces between materials having opposite electromagnetic charges or attractive forces present between materials which both have either a predominantly hydrophobic character or a predominantly hydrophilic character.

A popular method of attaching the disclosed multilayer foam to a floor panel—particularly a solid hardwood floor panel, an engineered wood floor panel, and a laminate floor panel—can be via a pressure sensitive adhesive layer that can be disposed on at least a portion of the foam surface and/or panel surface. Preferably, the adhesive layer can be disposed on the surface of a non-recycled layer of the multilayer foam structure. Any pressure sensitive adhesive known in the art may be used. Examples of such pressure sensitive adhesives are acrylic polymers, polyurethanes, thermoplastic elastomers, block copolymers, polyolefins, silicones, rubber based adhesives, copolymers of ethylhexylacrylate and acrylic acid, copolymers of isooctyl acrylate and acrylic acid, blends of acrylic adhesives and rubber based adhesives as well as combinations of the foregoing.

The multilayer foam attached to the floor panel—particularly a solid hardwood floor panel, an engineered wood floor panel, and a laminate floor panel—can serve several purposes. The foam can reduce the reflected sound pressure level when the panel is impacted, for example, when walking on the panel with boots or high heeled shoes. The foam can also act as a moisture vapor barrier between the panel and sub-floor and can help provide a more uniform laydown among multiple panels since any unevenness, bumps, or spikes (for example a protruding nailhead) on the sub-floor will be buffered by the foam. These floor panels and tiles can be commonly installed in residential homes, office buildings, and other commercial buildings.

Another embodiment of the present disclosure provides a flooring system including: a top floor layer; a sub-floor layer; and one or more underlayment layers where at least one of the underlayment layers contains the disclosed multilayer foam structure disposed between the sub-floor and the top floor layer. Preferably, the sub-floor and the top floor layers can be applied to sides/surfaces of non-recycled layers of the multilayer foam structure. In this system, the foam layer may or may not be joined to any adjacent layer, including the sub-floor or the top floor layer. When any layer in the disclosed system is joined, the attachment can be performed by means of chemical bonds, mechanical means, or combinations thereof. The adjacent layers may also be affixed to each other by any other means including the use of attractive forces between materials having opposite electromagnetic charges or attractive forces present between materials which both have either a predominantly hydrophobic character or a predominantly hydrophilic character. If any layers are attached, a popular method of attachment can be the use of either a one component urethane adhesive, a two component urethane adhesive, a one component acrylic adhesive, or a two component acrylic adhesive. The adhesive can be applied during the installation of the system in residential homes, office buildings, and commercial buildings. The foam in this system can serve several purposes. The foam can reduce the reflected sound pressure level when the top floor layer is impacted, for example, when walking on the panel with boots or high heeled shoes. The foam can also act as a moisture vapor barrier between the panel and sub-floor and help provide a more uniform laydown among multiple panels since any unevenness, bumps, or spikes (for example a protruding nailhead) on the sub-floor will be buffered by the foam. For cases where the top floor layer is composed of ceramic floor tiles, porcelain floor tiles, stone floor tiles, quartz floor tiles, cement floor tiles, and concrete floor tiles connected by grout and where all layers in the flooring system are joined, the foam can help reduce grout fracturing by buffering varying thermal expansions and contractions of the various layers in the system.

To satisfy the requirements of any of the above applications, the disclosed structures of the present disclosure may be subjected to various secondary processes, including and not limited to, embossing, corona or plasma treatment, surface roughening, surface smoothing, perforation or microperforation, splicing, slicing, skiving, layering, bonding, and hole punching.

EXAMPLES

Raw Materials for Examples

The following Table 1 provides a list of various components and descriptions of those components used in the following Examples.

TABLE 1

| Component | Type | Manufacturer | MFI | Description/Notes |
|---|---|---|---|---|
| 6232 | PP/PE random copolymer | Total Petrochemicals | 1.3-1.6 (2.16 kg, 230° C.) | commercially produced |
| Infuse ™ OBC 9107 | OBC (PE/octene copolymer based) | Dow | 0.75-1.25 (2.16 kg, 190° C.) | commercially produced olefin block copolymer |
| Adflex ™ Q100F | rTPO (PP/PE random copolymer based) | LyondellBasell | 0.5-0.7 (2.16 kg, 230° C.) | commercially produced reactor thermoplastic polyolefin |
| "04V2" | mechanically pulverized recycled crosslinked polyolefin foam material | Toray Plastics (America) | — | produced by shredding factory scrap crosslinked polyolefin foam, then agglomerating the foam, then granulating the agglomerate into 3-7 mm pieces, then mechanically pulverizing the 6 mm pieces into smaller particles |
| "02V2" | mechanically granulated recycled crosslinked polyolefin foam material | Toray Plastics (America) | — | produced by shredding factory scrap crosslinked polyolefin foam, then agglomerating the foam, then granulating the agglomerate into 3-7 mm pieces |
| Azofoam ® TC-18I | chemical foaming agent (ADCA) | P.T. Lauten Otsuka Chemical | — | commercially produced azodicarbonamide |
| DVB HP | crosslinking promotor | Dow | — | commercially produced, 80% DVB content |
| "PR023" | anti-oxidant package (LDPE carrier) | Techmer PM | — | a Toray Plastics (America) standard antioxidant package for polyolefin foam, compounded by Techmer PM, consisting of 14% antioxidants, 0.35% calcium stearate, and 85.65% low density polyethylene (LDPE) carrier resin |
| TPM11166 | processing aid (LLDPE/butene copolymer carrier) | Techmer PM | — | commercially produced extrusion processing aid blend |
| PE-500 | black concentrate (LLDPE carrier) | Modern Dispersions | — | commercially produced color concentrate, 50% carbon black loading, 75 Nm typical carbon black particle size |

Film Conversion Process for Examples

The following Table 2 provides the formulations for Examples 1-3.

TABLE 2

| | | | | | | | | | | |
|---|---|---|---|---|---|---|---|---|---|---|
| | | | FORMULATIONS | | | | | | | |
| | | | resins (PPHR & overall %) | | | | | | | |
| example ID | layer | PP/PE random copolymer 6232 | OBC (PE/octene copolymer based) Infuse ™ OBC 9107 | rTPO (PP/PE random copolymer based) Adflex ™ Q100F | recycled crosslink polyolefin foam "04V2" | recycled crosslinked polyolefin foam masterbatch (60% 6232, 40% "02V2", and anti-oxidant) 6232 | "02V2" | "PR023" | chemical foaming agent (ADCA) Azofoam ® TC-18I | x-linking promotor DVB HP |
| Example 1 | two outer "B" layers | 50 42.46% | 40 33.97% | 10 8.49% | | | | | 7.25 6.16% | 2.5 2.12% |
| | one inner "A" layer | 47.5 40.51% | 40 34.12% | 10 8.53% | 2.5 2.13% | | | | 7.25 6.18% | 2.5 2.13% |
| Example 2 | one "B" layer | 50 42.64% | 40 34.12% | 10 8.53% | | | | | 7.25 6.18% | 2.5 2.13% |
| | one "A" layer | 37.5 31.64% | 40 33.75% | 10 8.44% | | 7.5 6.33% | 5 4.25% | 0.27 0.23% | 7.25 6.12% | 2.5 2.11% |
| Example 3 | one "B" layer | 50 42.64% | 40 34.12% | 10 8.53% | | | | | 7.25 6.18% | 2.5 2.13% |
| | one "A" layer | 25 21.22% | 40 33.96% | 10 8.49% | | 15 12.73% | 10 8.49% | 0.54 0.46% | 7.25 6.16% | 2.5 2.12% |

The following Table 3 provides the coextrusion, irradiation, and properties of the multilayer structure of Examples 1-3.

TABLE 3

| | | | | | | | | | | | |
|---|---|---|---|---|---|---|---|---|---|---|---|
| | | | COEXRUSION | | | | | IRRADIATION | | | |
| example ID | layer | type | extruder | specific energy of extrusion (kW · hr/ kg) | temp. (° F.) | unfoamed layer thickness | which layer facing radiation source? | dosage (kGy) | voltage (kV) | foaming temp. (° F.) | type |
| Example 1 | two outer "B" layers | 80/20 feed block manifold | same co-rotating twin screw simultaneously feeding both "B" layers | 0.16 | 348 | 130-170 μm | one of each B layer | 50.00 | 725 | 441 | molten salt and radiant heaters |
| | one inner "A" layer | | co-rotating twin screw | 0.17 | 327 | 1.38 mm | the two "B" layers | | | | |
| Example 2 | one "B" layer | 80/20 feed block manifold | co-rotating twin screw | 0.10 | 308 | 190-210 μm | | 50.0 | 725 | not recorded, estimated 440-443 | molten salt & radiant heaters "B" layer facing radiant heaters and "A" layer floating on salt |
| | one "A" layer | | co-rotating twin screw | 0.16 | 325 | 1.37 mm | towards IR | | | | |

TABLE 3-continued

| | COEXRUSION | | | | | | | IRRADIATION | | | |
|---|---|---|---|---|---|---|---|---|---|---|---|
| example ID | layer | type | extruder | specific energy of extrusion (kW·hr/kg) | temp. (°F.) | unfoamed layer thickness | which layer facing radiation source? | dosage (kGy) | voltage (kV) | foaming temp. (°F.) | type |
| Example 3 | one "B" layer | 80/20 feed block manifold | co-rotating twin screw | 0.10 | 310 | 200-220 μm | | 50.0 | 725 | not recorded, estimated 440-443 | molten salt & radiant heaters "B" layer facing radiant heaters and "A" layer floating on salt |
| | one "A" layer | | co-rotating twin screw | 0.19 | 323 | 1.40 mm | towards IR | | | | |

Images of the Examples at various stages of the foam structure production process can be found in FIGS. 4-10.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A method of forming a multilayer structure comprising: shredding a polyolefin foam, agglomerating the shredded foam, and granulating the agglomerated foam to form a recycled, crosslinked polyolefin foam material; and coextruding:
    a first layer comprising:
        polypropylene, polyethylene, or a combination of polypropylene and polyethylene; and
        a first chemical foaming agent; and
    a second layer on a side of the first layer, the second layer comprising:
        2.5-25 wt. % the recycled, crosslinked polyolefin foam material;
        75-97.5 wt. % polypropylene, polyethylene, or a combination of polypropylene and polyethylene; and
        a second chemical foaming agent.

2. The method of claim 1, wherein the granules of the recycled, crosslinked polyolefin foam material have a width of 3-7 mm.

3. The method of claim 1, further comprising mechanically pulverizing the granules of the recycled, crosslinked polyolefin foam material.

4. The method of claim 3, wherein particles of the mechanically pulverized recycled, crosslinked polyolefin foam material have a width of 0.2-2 mm.

5. The method of claim 1, further comprising coextruding a third layer on a side of the second layer opposite the first layer, the third layer comprising:
    polypropylene or polyethylene; and
    a third chemical foaming agent.

6. The method of claim 5, wherein the first layer and the third layer are substantially free of recycled polyolefin material.

7. The method of claim 5, wherein the first, second, and third layers comprise a crosslinking agent.

8. The method of claim 5, wherein the first, second, and third chemical foaming agent is azodicarbonamide.

9. The method of claim 5, wherein the first layer and third layer comprise polypropylene and polyethylene.

10. The method of claim 1, wherein the first layer comprises polypropylene with a melt flow index of 0.1-25 grams per 10 minutes at 230° C.

11. The method of claim 1, wherein the first layer comprises polyethylene with a melt flow index of 0.1-25 grams per 10 minutes at 190° C.

12. A method of forming a multilayer foam structure comprising:
    shredding a polyolefin foam, agglomerating the shredded foam, and granulating the agglomerated foam to form a recycled, crosslinked polyolefin foam material;
    coextruding:
        a first layer comprising:
            polypropylene or polyethylene; and
            a first chemical foaming agent; and
        a second layer on a side of the first layer, the second layer comprising:
            2.5-25 wt. % the recycled, crosslinked polyolefin foam material;
            75-97.5 wt. % polypropylene, polyethylene, or a combination of polypropylene and polyethylene; and
            a second chemical foaming agent;
    irradiating the coextruded layers with ionizing radiation; and
    foaming the irradiated, coextruded layers.

13. The method of claim 12, further comprising coextruding a third layer on a side of the second layer opposite the first layer, the third layer comprising:

polypropylene or polyethylene; and
a third chemical foaming agent.

14. The method of claim 13, wherein the first layer and the third layer are substantially free of recycled polyolefin material.

15. The method of claim 13, wherein the first layer and third layer comprise polypropylene and polyethylene.

16. The method of claim 12, wherein the granules of the recycled, crosslinked polyolefin foam material have a width of 3-7 mm.

17. The method of claim 12, further comprising mechanically pulverizing the granules of the recycled, crosslinked polyolefin foam material.

18. The method of claim 17, wherein particles of the mechanically pulverized recycled, crosslinked polyolefin foam material have a width of 0.2-2 mm.

19. The method of claim 12, wherein the ionizing radiation is selected from the group consisting of alpha, beta (electron), x-ray, gamma, and neutron.

20. The method of claim 12, wherein the coextruded structure is irradiated up to 4 separate times.

21. The method of claim 20, wherein the ionizing radiation is an electron beam with an acceleration voltage of 200-1500 kV.

22. The method of claim 21, wherein an absorbed electron beam dosage is 10-500 kGy.

23. The method of claim 12, wherein the ionizing radiation crosslinks the extruded structure to a crosslinking degree of 20-75%.

24. The method of claim 12, wherein foaming comprises heating the irradiated structure with molten salt.

25. The method of claim 12, wherein the multilayer foam structure has a density of 20-250 kg/m$^3$.

26. The method of claim 12, wherein the multilayer foam structure has an average closed cell size of 0.05-1.0 mm.

27. The method of claim 12, wherein the multilayer foam structure has a thickness of 0.2-50 mm.

28. The method of claim 12, wherein a mean surface roughness for the first layer is less than 80 μm.

* * * * *